(12) United States Patent
Erickson et al.

(10) Patent No.: US 11,071,257 B2
(45) Date of Patent: Jul. 27, 2021

(54) SYSTEM FOR PROMOTING PLANT GROWTH AND PRODUCTION

(71) Applicants: Stewart E. Erickson, Hudson, WI (US); Robert McPherson, Eden Prairie, MN (US)

(72) Inventors: Stewart E. Erickson, Hudson, WI (US); Robert McPherson, Eden Prairie, MN (US)

(73) Assignee: The Agricultural Gas Company

( * ) Notice: Subject to any disclaimer, the term of this patent is extended or adjusted under 35 U.S.C. 154(b) by 487 days.

(21) Appl. No.: 15/934,693

(22) Filed: Mar. 23, 2018

(65) Prior Publication Data
US 2018/0368336 A1 Dec. 27, 2018

Related U.S. Application Data

(60) Provisional application No. 62/475,258, filed on Mar. 23, 2017.

(51) Int. Cl.
| | | |
|---|---|---|
| *A01G 9/18* | (2006.01) | |
| *A01G 7/06* | (2006.01) | |
| *A01G 9/24* | (2006.01) | |
| *G05B 15/02* | (2006.01) | |
| *A01G 22/00* | (2018.01) | |
| *A01M 7/00* | (2006.01) | |
| *G01N 21/84* | (2006.01) | |

(52) U.S. Cl.
CPC .......... *A01G 9/18* (2013.01); *A01G 7/06* (2013.01); *A01G 9/243* (2013.01); *A01G 9/246* (2013.01);
(Continued)

(58) Field of Classification Search
CPC ... A01G 9/18; A01G 7/02; A01G 9/24; A01G 9/243; A01G 9/246; A01G 9/00;
(Continued)

(56) References Cited

U.S. PATENT DOCUMENTS 3,099,898 A * 8/1963 Harris ............... A01C 23/023
47/58.1 R
5,409,508 A * 4/1995 Erickson ............... A01G 7/02
47/1.01 R
(Continued)

FOREIGN PATENT DOCUMENTS

| CN | 102811606 A | * 12/2012 | ............... F21V 29/60 |
| EP | 41161 A1 | * 12/1981 | ............... A01G 9/24 |
| GB | 241164 A | * 12/1925 | ............... A01G 7/02 |

*Primary Examiner* — Kathleen I Alker
(74) *Attorney, Agent, or Firm* — Skinner and Associates; Joel D. Skinner, Jr.

(57) ABSTRACT

A system for applying $CO_2$ gas to improve Cannabis production. A multi-stage system is disclosed including upstream, midstream, and downstream stages or subsystems. The upstream subsystem receives and stores gas, particularly CO2 gas. The midstream subsystem is communicatively connected to the upstream subsystem and to the downstream subsystem. It monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem includes one or more plant growth areas or plots, gas distribution means, such as gas conduits, tubes or lines from the midstream subsystem, and the high efficiency, adjustable gas applicator, and various sensing and monitoring devices communicatively connected to the midstream subsystem.

18 Claims, 31 Drawing Sheets

(52) U.S. Cl.
CPC ............ *A01G 22/00* (2018.02); *G05B 15/02* (2013.01); *A01G 9/247* (2013.01); *A01M 7/0014* (2013.01); *G01N 2021/8466* (2013.01)

(58) Field of Classification Search
CPC . A01G 7/06; A01G 7/00; A01G 22/00; G05B 15/02; A01M 7/0014
See application file for complete search history.

(56) References Cited

U.S. PATENT DOCUMENTS

| | | | | |
|---|---|---|---|---|
| 5,956,896 | A * | 9/1999 | Miekka | A01G 9/18 47/17 |
| 6,108,967 | A * | 8/2000 | Erickson | A01B 79/02 47/1.01 R |
| 7,931,921 | B2 * | 4/2011 | Maier | A01N 59/04 424/700 |
| 8,919,037 | B1 * | 12/2014 | Petran | A01G 9/24 47/17 |
| 9,894,844 | B2 * | 2/2018 | Takashima | A01G 7/02 |
| 2006/0162247 | A1 * | 7/2006 | Corbett | A01G 9/16 47/29.1 |
| 2009/0007779 | A1 * | 1/2009 | Coignet | A01G 9/18 95/51 |
| 2012/0216459 | A1 * | 8/2012 | Currier | A01G 7/02 47/58.1 R |
| 2018/0125016 | A1 * | 5/2018 | Dufresne | A01G 9/246 |
| 2019/0029186 | A1 * | 1/2019 | Erickson | A01G 9/249 |

* cited by examiner

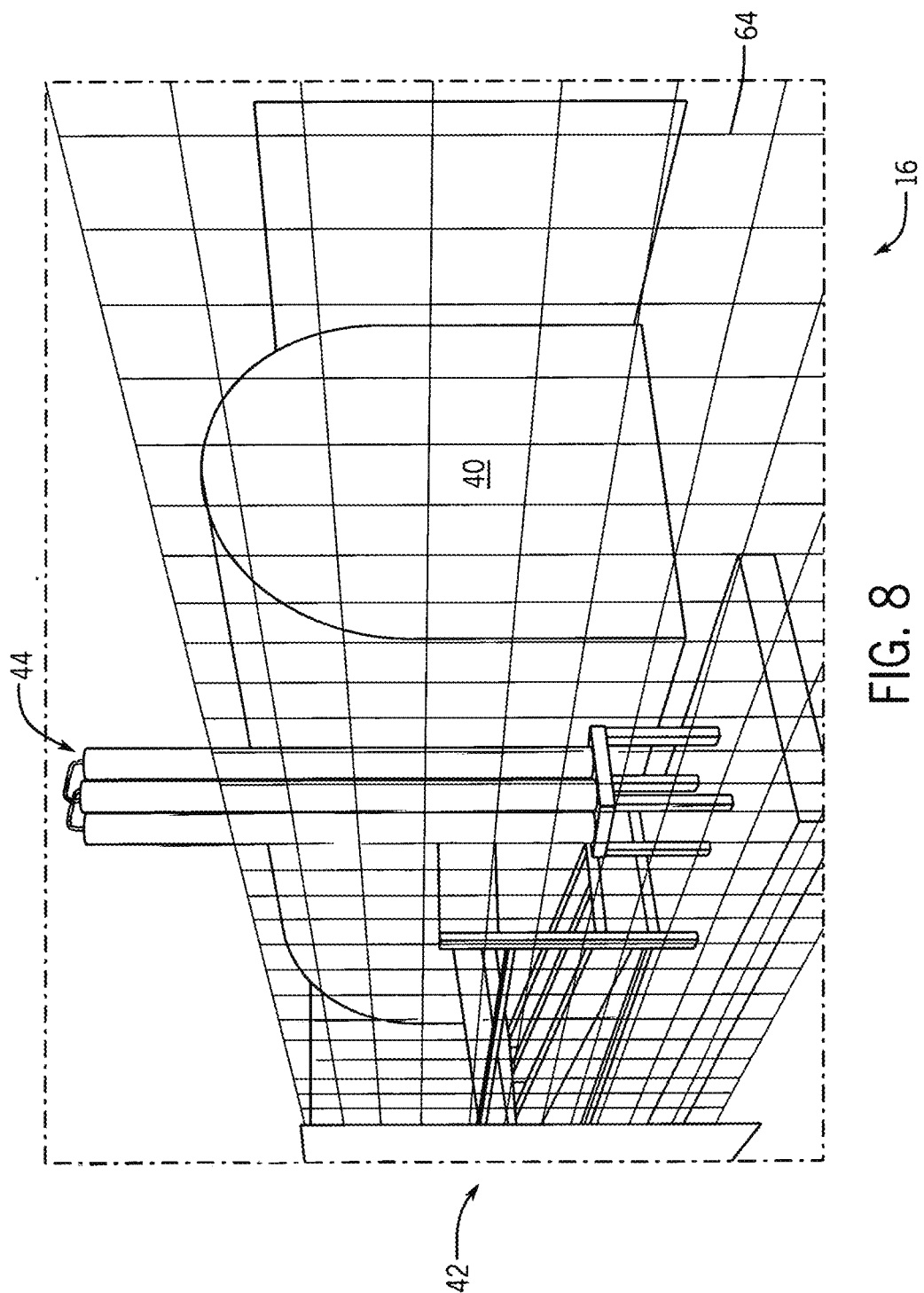

FIG. 13
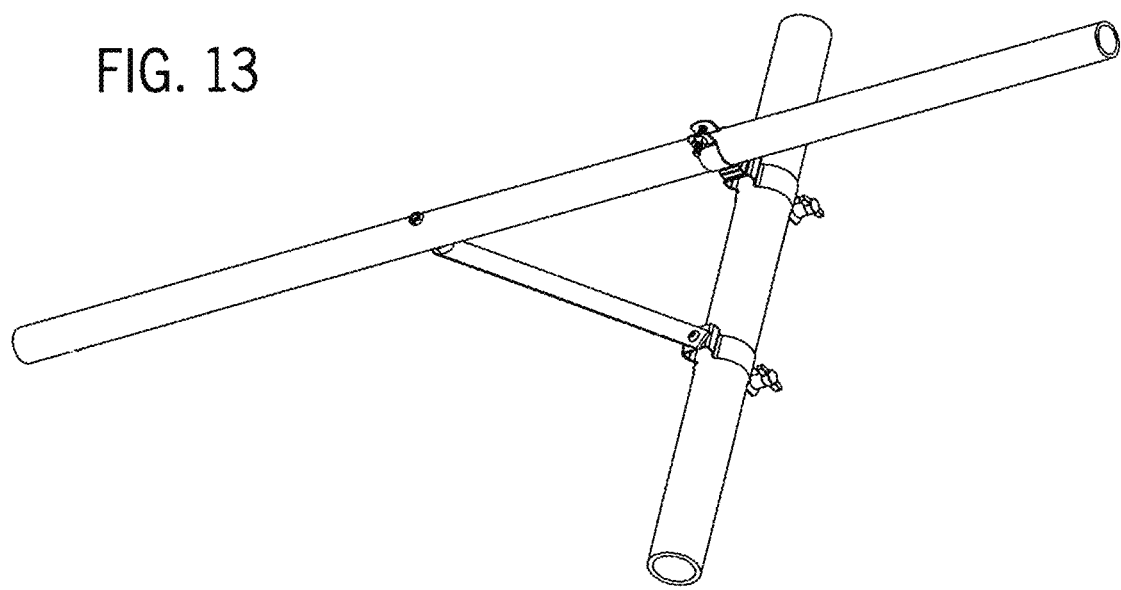
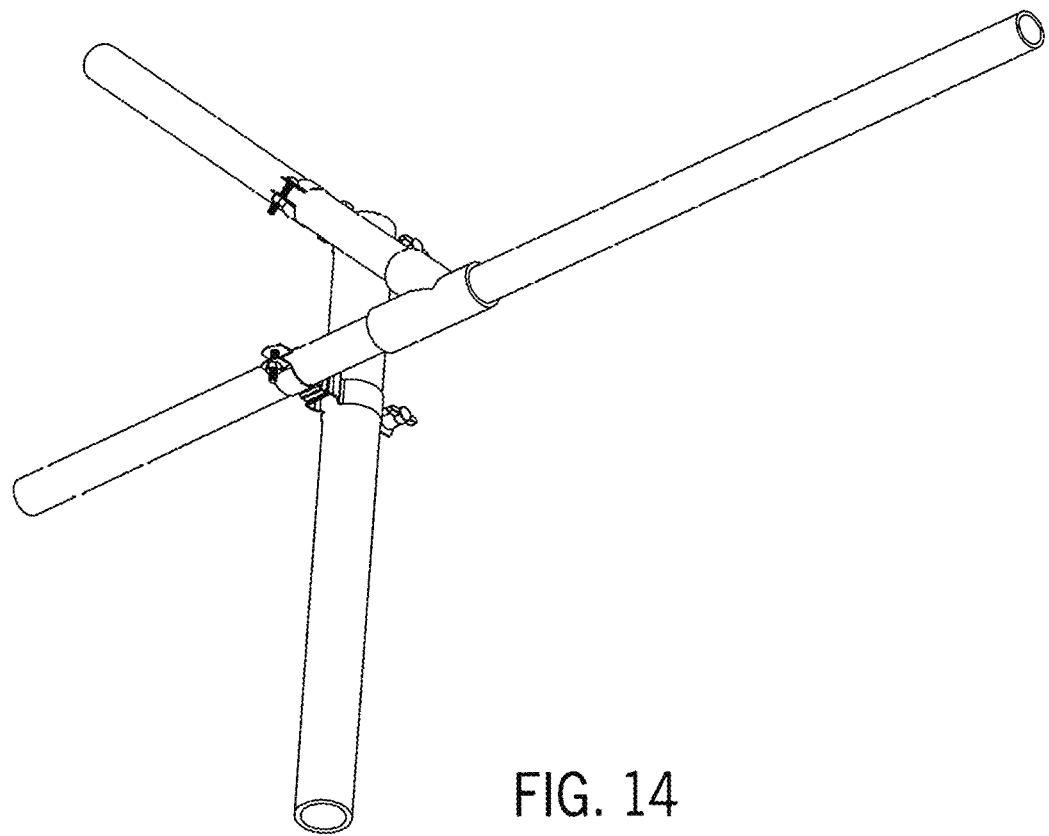
FIG. 14

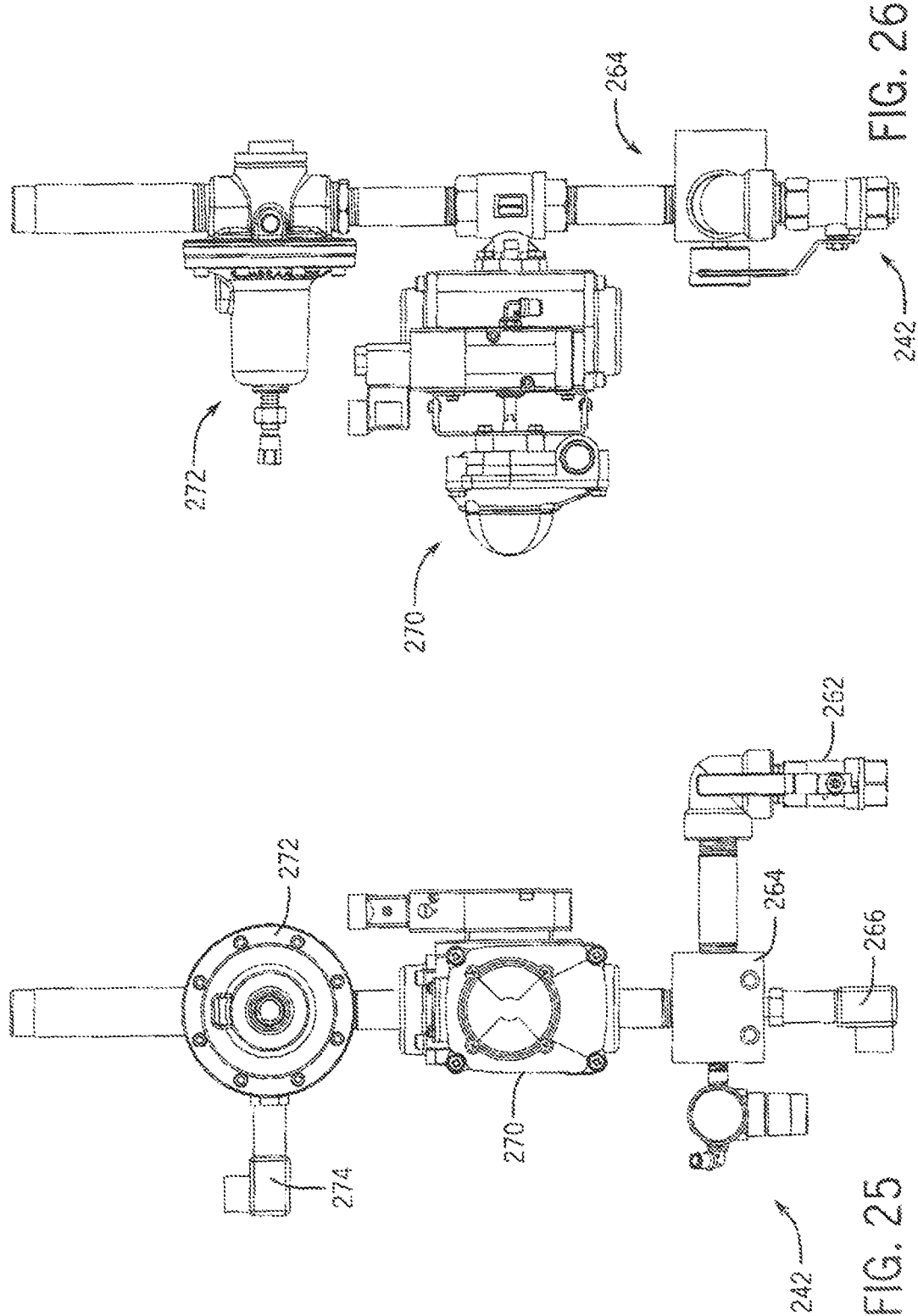

SYSTEM FOR PROMOTING PLANT GROWTH AND PRODUCTION

CROSS-REFERENCE TO RELATED APPLICATIONS IF ANY

This application claims the benefit under 35 U.S.C. 4119(e) of U.S. Provisional Patent Application Ser. No. 62/475,258, filed Mar. 23, 2017, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field if the Invention

The present invention relates, generally, to agricultural systems, apparatus and methods. Particularly, the invention relates to a system of delivering gases to crops. More particularly, the invention relates to an integrated, self-supporting $CO_2$ gas delivery system. Most particularly, the system is useable to promote plant growth and production in Cannabis.

2. Background Information

Hoop house are generally about 60 long, with some be much longer or greenhouses being much longer providing the overall bed length for planting of crops such as cannabis. Long beds of Cannabis and other crops of this configuration are also planted outdoors.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an agricultural system, apparatus, and method which are beneficial, practical, reliable, and efficient, and which are believed to fulfill the need and to constitute an improvement over the background technology.

In one aspect, the invention provides a system for applying $CO_2$ gas to improve Cannabis production. A multi-stage system is disclosed including upstream, midstream, and downstream stages or subsystems. The upstream subsystem receives and stores gas, particularly CO2 gas. The midstream subsystem is communicatively connected to the upstream subsystem and to the downstream subsystem. It monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem includes one or more plant growth areas or plots, gas distribution means, such as gas conduits, tubes or lines from the midstream subsystem, and the high efficiency, adjustable gas applicator, and various sensing and monitoring devices communicatively connected to the midstream subsystem.

In another aspect, the invention provides a system of promoting plant growth and production, comprising a CO2 gas supply; a gas controller communicatively connected to the gas supply; and at least one CO2 gas emitter communicatively connected to the gas subcontroller and adapted to being disposed near at least one growing plant, the gas emitter being height adjustable whereby as the plant grows, the gas emitter may remain in close proximity to the plant.

In a further aspect, the system promotes Cannabis plant growth and production in a hoop house environment, comprising:

a. a CO2 gas supply, the gas supply includes a liquid CO2 tank, a pressure builder connected to the tank, and a vaporizer connected to the pressure builder to convert liquid CO2 to CO2 gas;

b. a gas controller communicatively connected to the gas supply, the gas controller includes a gas input valve communicatively connected to the vaporizer, a gas manifold communicatively connected to the input valve, and an output valve communicatively connected to the gas manifold; and c. at least one CO2 gas emitter communicatively connected to the gas subcontroller and adapted to being disposed near at least one growing plant, the gas emitter being height adjustable whereby as the plant grows, the gas emitter may remain in close proximity to the plant, the gas emitter including: (i) a gas manifold connected to the output valve, and (ii) a pair of elongated gas emission conduits connected to the gas manifold, each conduit having a plurality of gas emission orifices, the emission conduits being height adjustable proximate the Cannabis plant plants.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 8 shows an embodiment of the upstream components and features of the invention, including a gas storage tank, a pressure builder and a vaporizer.

FIG. 13 illustrates yet another embodiment of a cantilevered arm including a crossover manifold center.

FIG. 14 illustrates still another embodiment of a cantilevered arm, including a cross over manifold center support.

FIG. 25 is a front view of an embodiment of a gas input valve assembly.

FIG. 26 is a side view of the gas input valve assembly.

DETAILED DESCRIPTION

The present invention provides a system, apparatus, and methods for enhancing the growth of plants, particularly Cannabis, and most particularly Cannabis grown in green houses, hoop houses and the like. The invention utilizes Carbon Dioxide gas ($CO2$ or $CO_2$). The invention administers the gas in close proximity to plants growing in groups or plots so that the plants receive a maximum beneficial amount of the gas, for the longest reasonably possible time period. This also reduces cost to the grower. The system is able to maintain that close proximity distribution by various means including height adjustment means that permit the grower to easily adjust gas application height throughout the plant growth life cycle from seedlings or clones, juveniles, to mature plants ready for harvest. Further, the system permits fast and easy retraction at harvest time so that the gas distribution and application devices do not interfere with harvest tasks, whether manually or mechanized. The system is optimized to provide full monitoring and control of gas application, coordinated with light exposure, temperature regulation, watering, fertilizing and the like. The system may be integrated with lighting, heating, watering and feeding system. Alternatively, it may be readily retrofitted to existing systems and devices.

Figure 1:
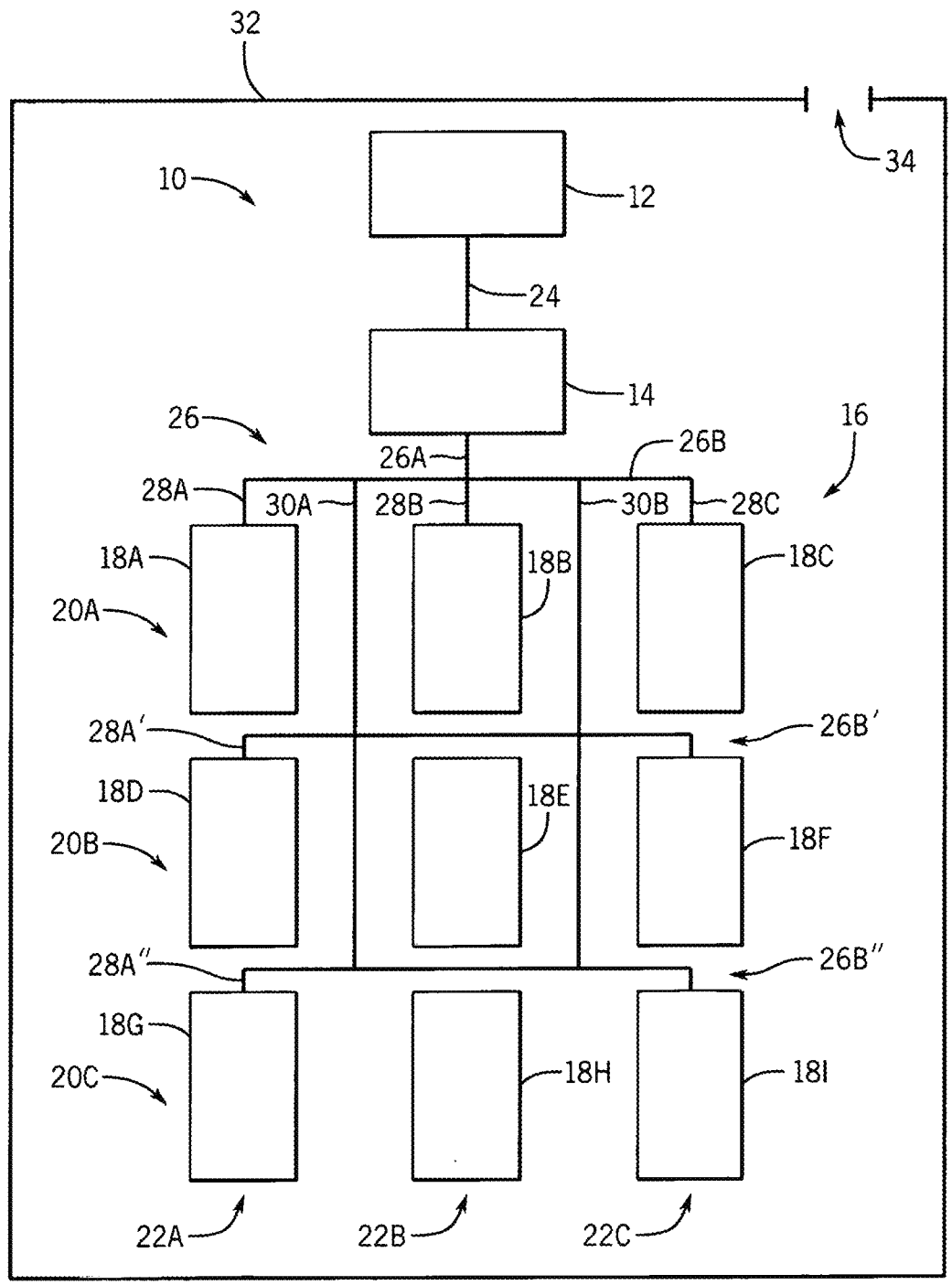
FIG. 1 is a diagram of an embodiment of the system of the invention, including upstream, midstream and downstream subsystems, features and components.
Figure 6:
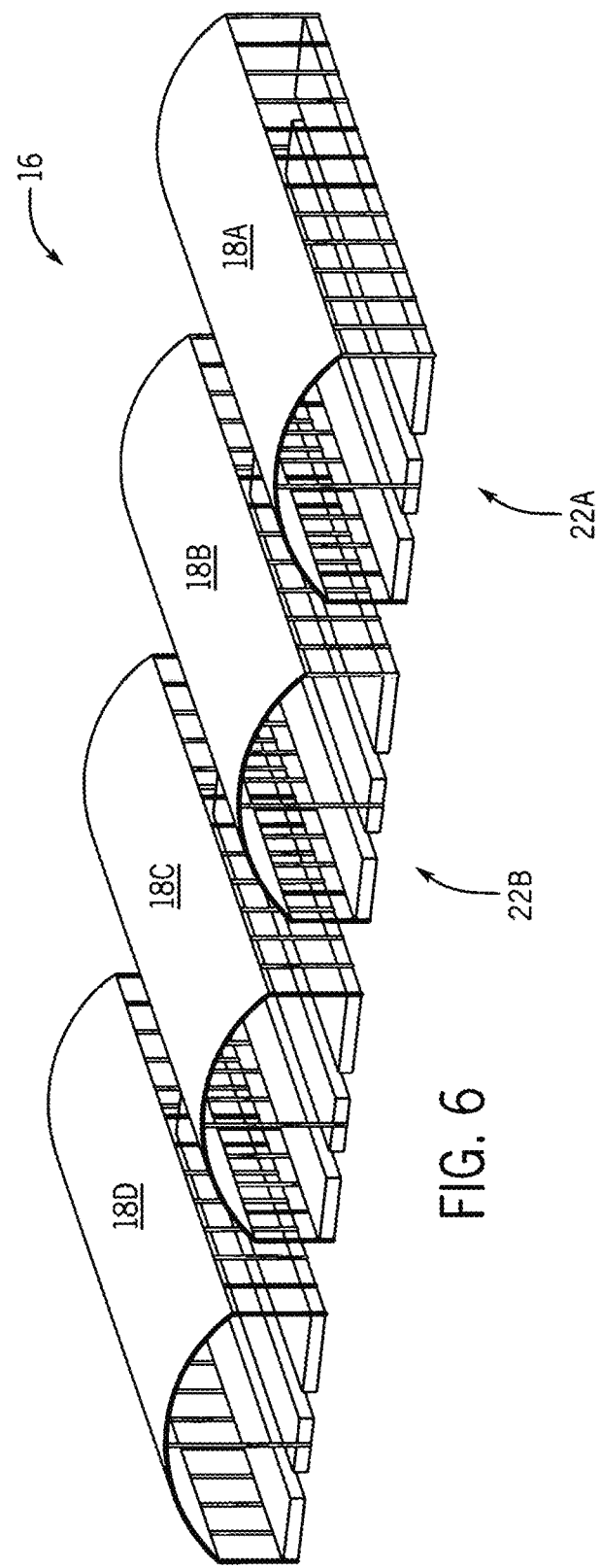
FIG. 6 is a perspective showing of a hoop farm of the invention, including plural hoop houses laid out in rows and columns.

Referring to FIGS. 1 and 6, a preferred embodiment of the system 10 of the invention is preferably a multi-stage system which basically comprises upstream 12, midstream 14 and downstream 16 stages or subsystems. The upstream subsystem 12 receives and stores gas, particularly CO2 gas. The midstream subsystem 14 is communicatively connected to the upstream subsystem 12 and to the downstream subsystem 16. It monitors the environment of the downstream subsystem 16, determines when and how to apply gas to plants growing in the downstream system 16, acquires gas stored in the upstream subsystem 12, and distributes it to the downstream system 16. It also has various monitoring, command and control, management, and reporting features. The downstream subsystem 16 comprises one or more plant growth areas or plots, gas distribution means, such as gas conduits, tubes or lines from the midstream subsystem, and the high efficiency, adjustable gas application means, and various sensing and monitoring means communicatively connected to the midstream subsystem.

In the preferred embodiment, the plant growth plot or plots are preferably relatively compact, sheltered environments such as green houses or greenhouses. Most particularly, the green houses are hoop-type houses that are easy to construct from basic materials such as dimensional lumber, PVC plastic conduit, lightweight but ridged metal tubing and the like for base structures. They typically have roofs or tops, most often constructed of transparent or semi transparent, thin, flexible plastic material. The plastic sheet or sheets are placed over and supported by hoop supports (typically curved to shed rain, wind, snow and the like) placed at predetermined distances apart, which are supported by the base structure. The sheets are typically stretched tight over the roof hoop supports to aid in shedding the element, but also to reduce noise from flapping in the wind, and to improve structural integrity Houses typically have side and end walls. Such walls may be adjusted or removed depending up temperature, climate and other factors. The walls are also typically constructed of flexible materials, most typically transparent or semi transparent materials. Hoop houses commonly are constructed on grade and have rectangular floor plans. Plants may be grown on grade, with existing soil (enhanced or not). The system may also be applied to houses constructed on slabs of concrete, asphalt or other non-soil substrates. Lastly the system may be deployed in existing interior structures such as permanent greenhouses, warehouses, and other structures. A preferred embodiment utilizes plant boxes constructed of dimensional lumber such as 2×12s, and filled with a plant growth media composed of soil, and other materials beneficial to plant growth. Hoop houses may be provided with irrigation systems, light systems, heating systems, power, and the like. Although the invention is described in the context of a hoop houses, it is within the purview of the invention that the systems, apparatus and methods may be applicable to green houses or outside in fields, orchards, vineyards and the like.

Figure 3:
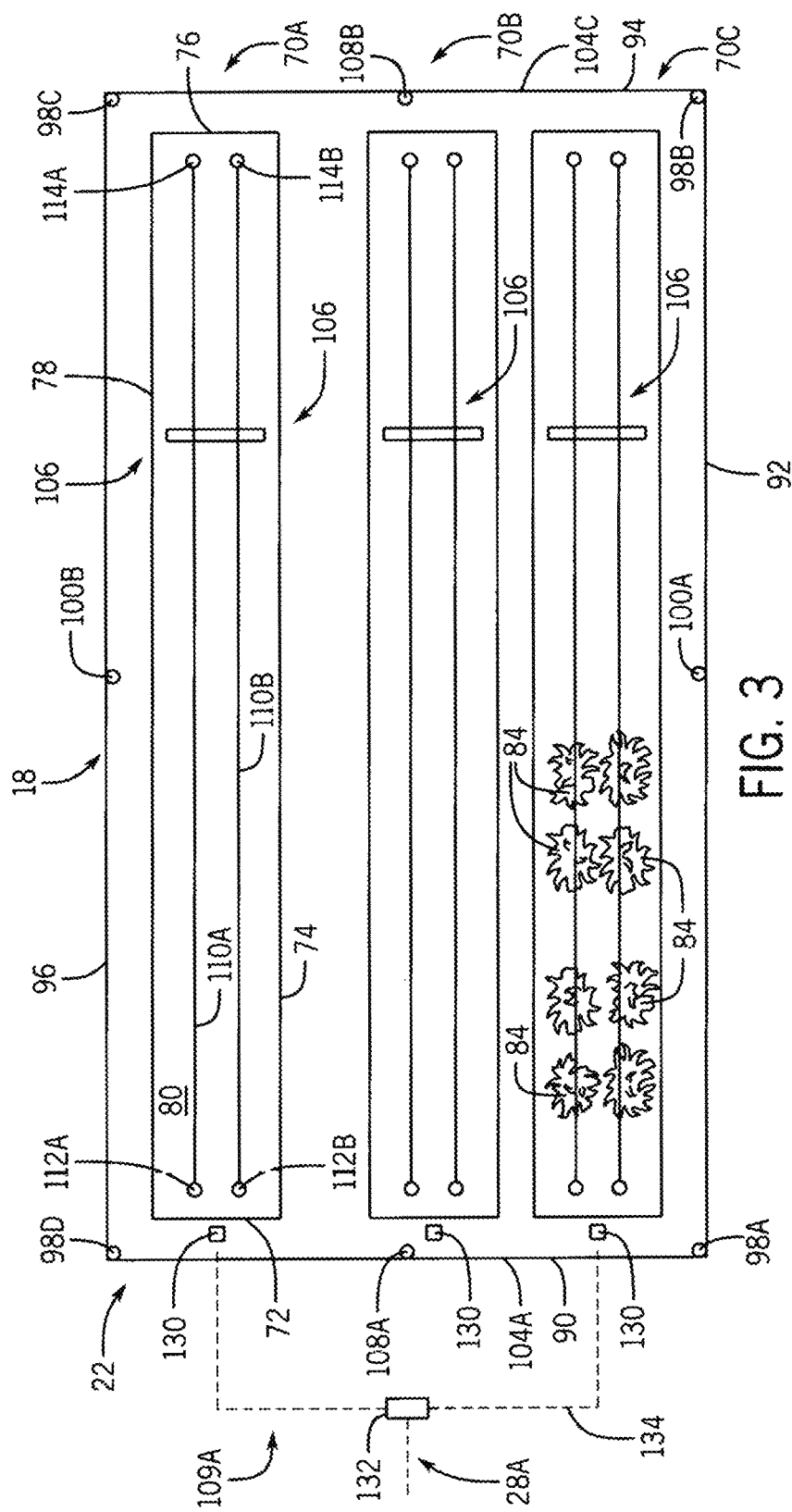
FIG. 3 is a plan view of an embodiment of the a hoop house and downstream components of the invention.
Figure 4:
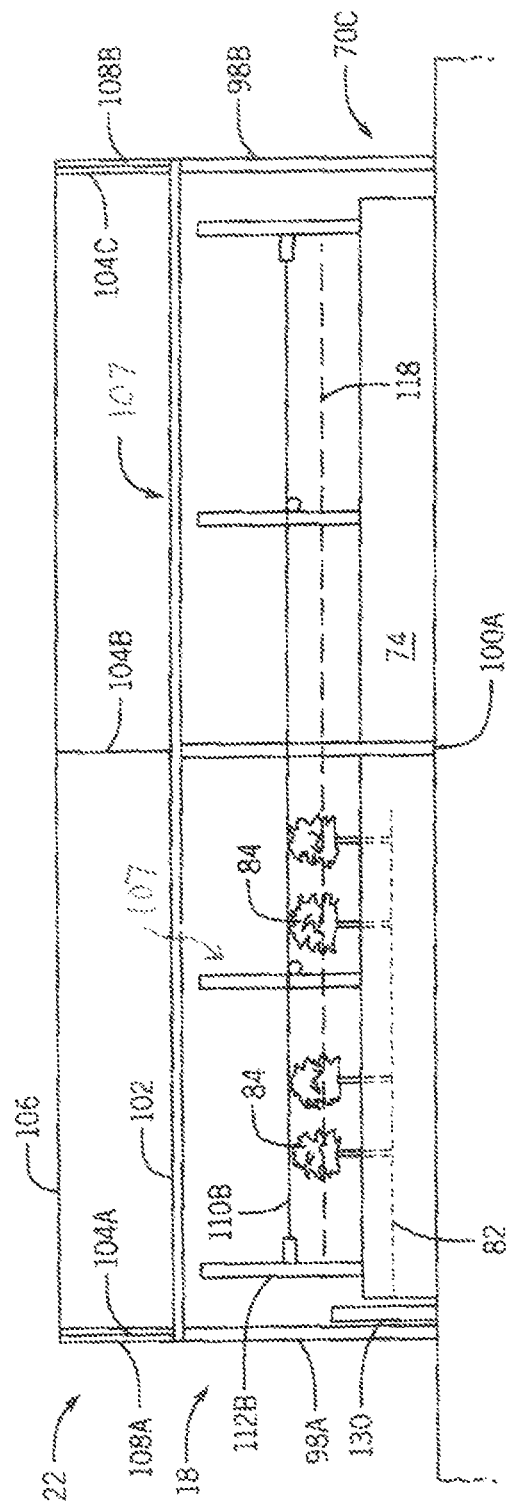
FIG. 4 is a side elevation view of the components and features of FIG. 3.
Figure 5:
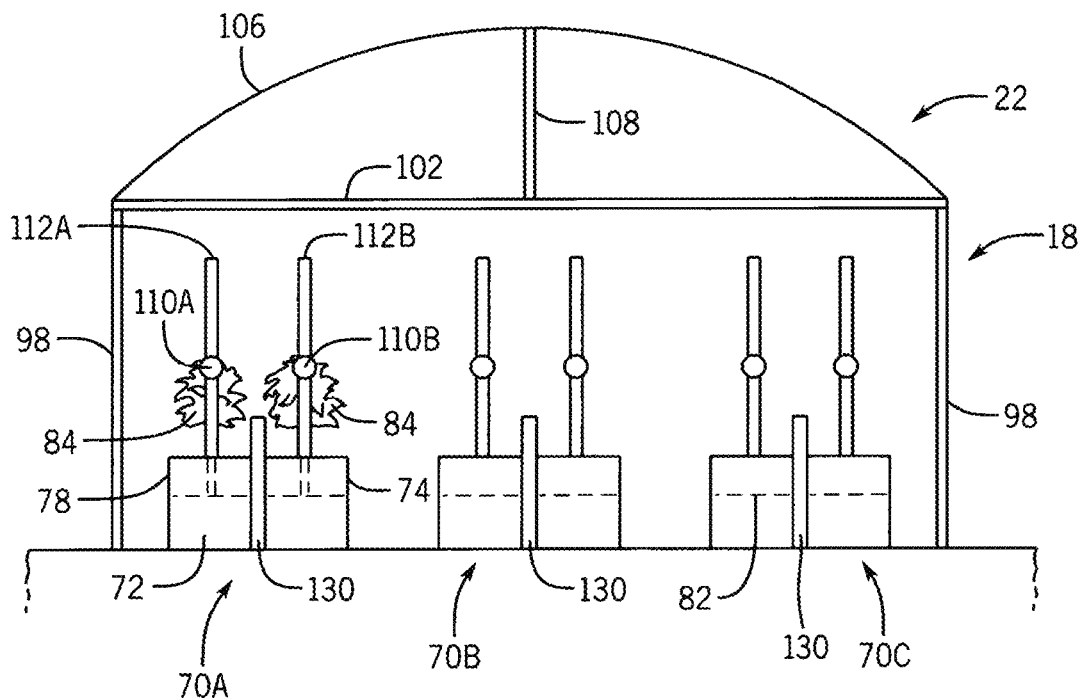
FIG. 5 is an end view of the components and features of FIGS. 3 and 4.

In the preferred embodiments shown in FIG. 1, the downstream subsection 16 consists of multiple hoop houses constituting a farm, with plural houses 18 A–1 arranged in rows 20 A-C and columns 22 A-C. Paths exist between rows 20 and columns 22 of houses 18 for convenient movement of staff, equipment, material and harvested crops. Referring also to FIGS. 3-5, the hoop houses 18 have an elongated, rectangular configuration with first or proximal, and second or distal end walls 90 and 94, respectively, and side walls 92 and 96. Walls 90-96 are supported by corner posts 98A-D and a plurality of mid posts 100, the number of which depend upon the length of the house 18. The vertical walls 90-96 have a peripheral top plate 102. Curved, roof hoops 104 extend from one side of the plate 102 to the other. Roof material 106 is supported by the hoops 104. The roof may be supported at its ends by one or more end supports 108.

The exemplary houses 18 for growing Cannabis have a length of approximately sixty (60) feet (18.28 meters), a width of fifteen (15) ft. (4.57-m.), and a height of five (5) ft. (1.52 m.) measured at the base wall and nine (9) ft. (2.74 in.) at the apex of the hoop. In the preferred embodiment, the downstream stage or farm 16 of hoop houses 18 is disposed within a fence 32 or other security structure. Ingress and egress occurs though one or more gates 34.

The upstream subsystem 12 is communicatively connected to the midstream 14 subsystem via gas, electrical and data lines conduits 24 Gas distributed by the midstream subsection 14 is output at a main supply line 26A. Depending upon the layout of the elements of the downstream subsection 16, the main supply 26A may be divided by a lateral trunk 26B and supply individual plots 18A-C via plot lines 28A-C. Gas may extend to plots 18D-1 disposed in columns behind a first row 20A of plots 18A-C via longitudinal feed lines 30A-B. and then to further lateral trunks 26B' and 26B". Although the layout of plots 18 in the downstream subsection have been shown rectilinearly, they may be disposed in various other linear or non-linear arrangements. Gas lines 24, 26, 28, and 30 are preferably buried, but they may be disposed above grade.

Figure 2:
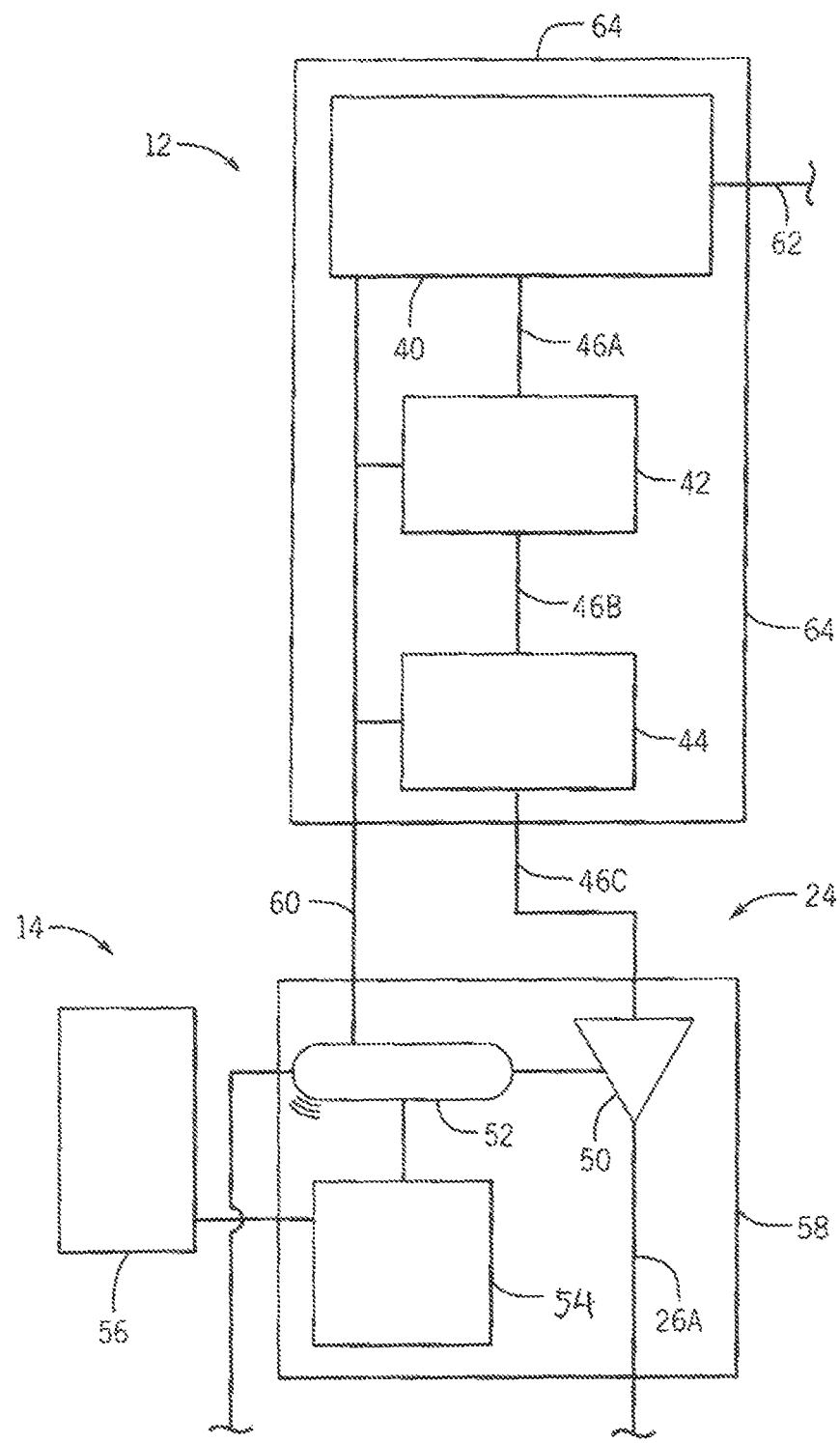
FIG. 2 is a more detailed diagrammatic view embodiments of the upstream and midstream subsystems, and their features and components.
Figure 7:
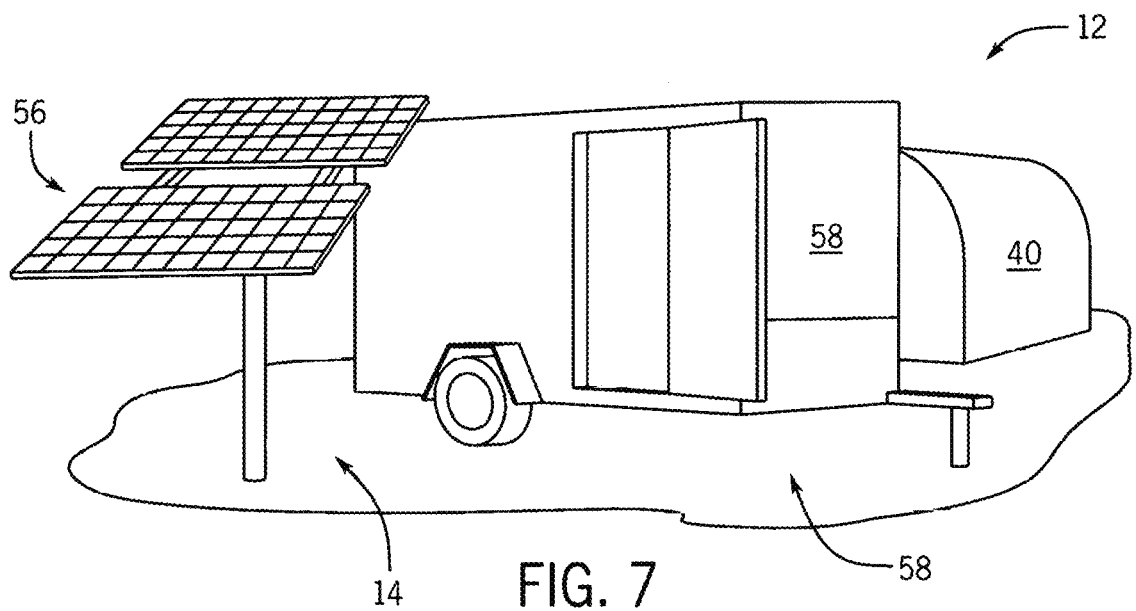
FIG. 7 shows an embodiment of the upstream and midstream components and features of the invention, including a gas storage tank being filled by a gas transportation truck, a trailer containing various gas and electronic control features, and a solar power array.

A preferred embodiment of the upstream subsection 12 is shown in FIGS. 2, 7 and 8. The subsection 12 preferably comprises a tank 40, a pressure builder 42, and a vaporizer 44. The tank 40 holds liquid Carbon Dioxide ($CO_2$). It has a bulk storage capacity of between 5 and 50 Tons of liquefied $CO_2$. It is within the purview of the invention that $CO_2$ may be supplied in smaller quantiles such as 1,000 pound Dewers. And the system may be deployed in close proximity to a $CO_2$ manufacturing facility (i.e. an ethanol, ammonia or power generating plant) and be directly supplied therefrom. An exemplary tank is manufactured by Matheson of Egan, Minn., USA. The tank 40 has a fill inlet 62. The pressure builder 42 is connected to the tank 40 via line 46A. An exemplary pressure builder 42 is manufactured by Air Products of Allentown, Pa., USA. The vaporizer 44 is connected to the pressure builder 42 via line 46B. It functions to convert $CO_2$ in a liquid state from the pressure builder 42 into a $CO_2$ in a gas state. $CO_2$ gas exits outlet 46C at a pressure of between 200 and 400 psi., preferably 300 psi. An example vaporizer 44 is available from Doucette Industries of York, Pa., USA. The upstream subassembly 12 is preferably secured by it's own security fence 64.

Still referring to FIG. 2, a preferred embodiment of midstream subsection 14 comprises a valve assembly 50, an electronic control assembly 52, and a power supply 54. These components are preferably located in a secure housing. In the preferred embodiment, they are shown disposed in a trailer 58. The valve assembly 50 is connected to the output 46C of the upstream assembly 12 and controls distribution of $CO_2$ gas to the downstream system 16 via output 26A. The electronic control assembly 52 is communicatively connected to the valve assembly 50 and provides instructions to it distribution of gas. The electronic control assembly 52 is powered by power supply 54. The power supply 54 preferably contains batteries and AC power connections. The midstream section 14 also preferably has a solar array 56 for recharging the batteries of the power supply 54. The electronic control assembly 52 preferably has both direct wire connections and wireless (WIFI, RF or the like) connections to various sensors (temperature, humidity, $CO_2$ concentration, light) disposed in the downstream section 16. The electronic control assembly 52 also preferably has means to connect remotely via hardwire telephone, CDMA cell and/or satellite transmission.

Figure 9:
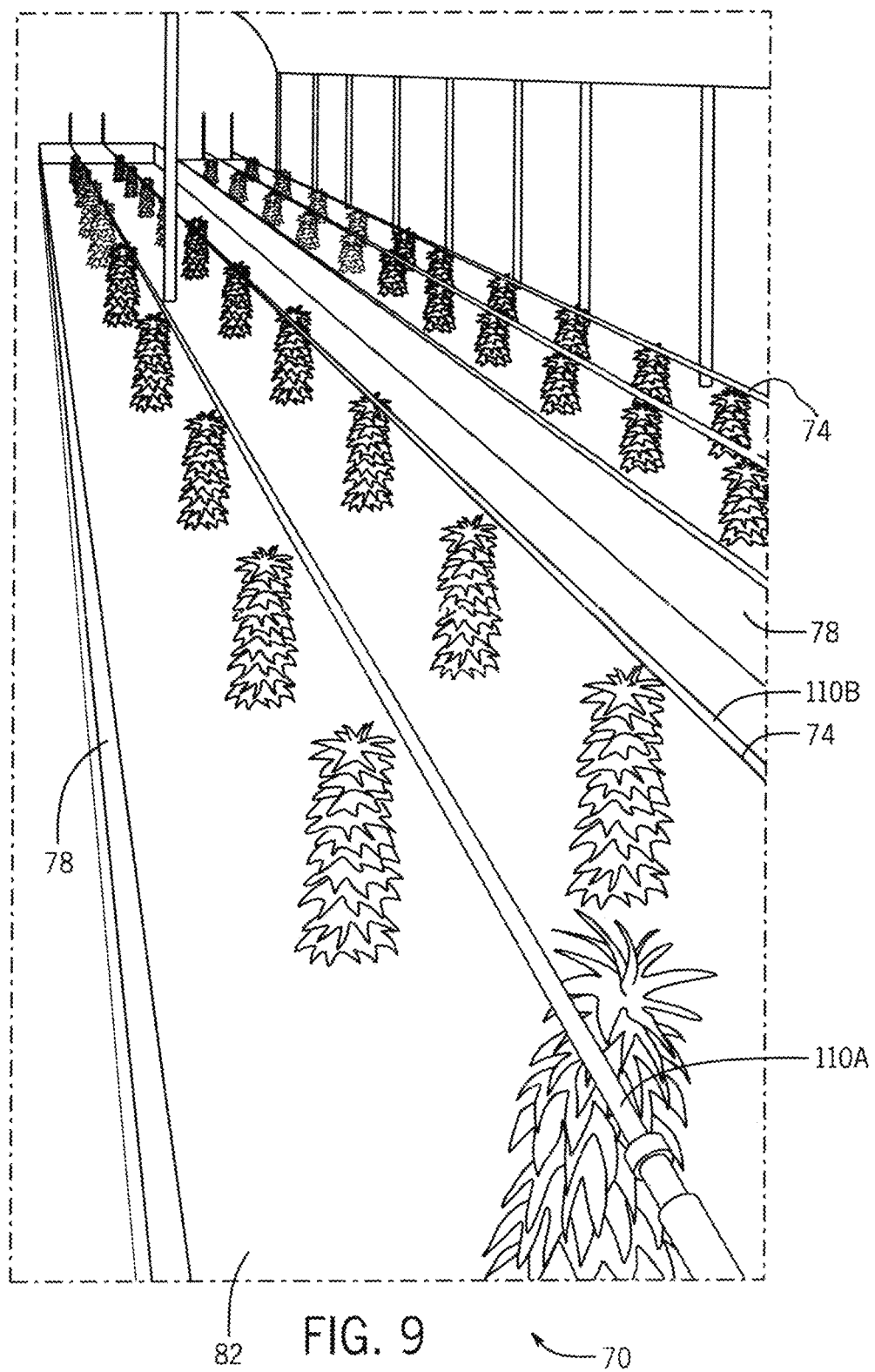
FIG. 9 shows an embodiment of a planter contained within the hoop house and including a pair of gas emitter lines operatively disposed above plants growing within media in the planter.
Figure 16:
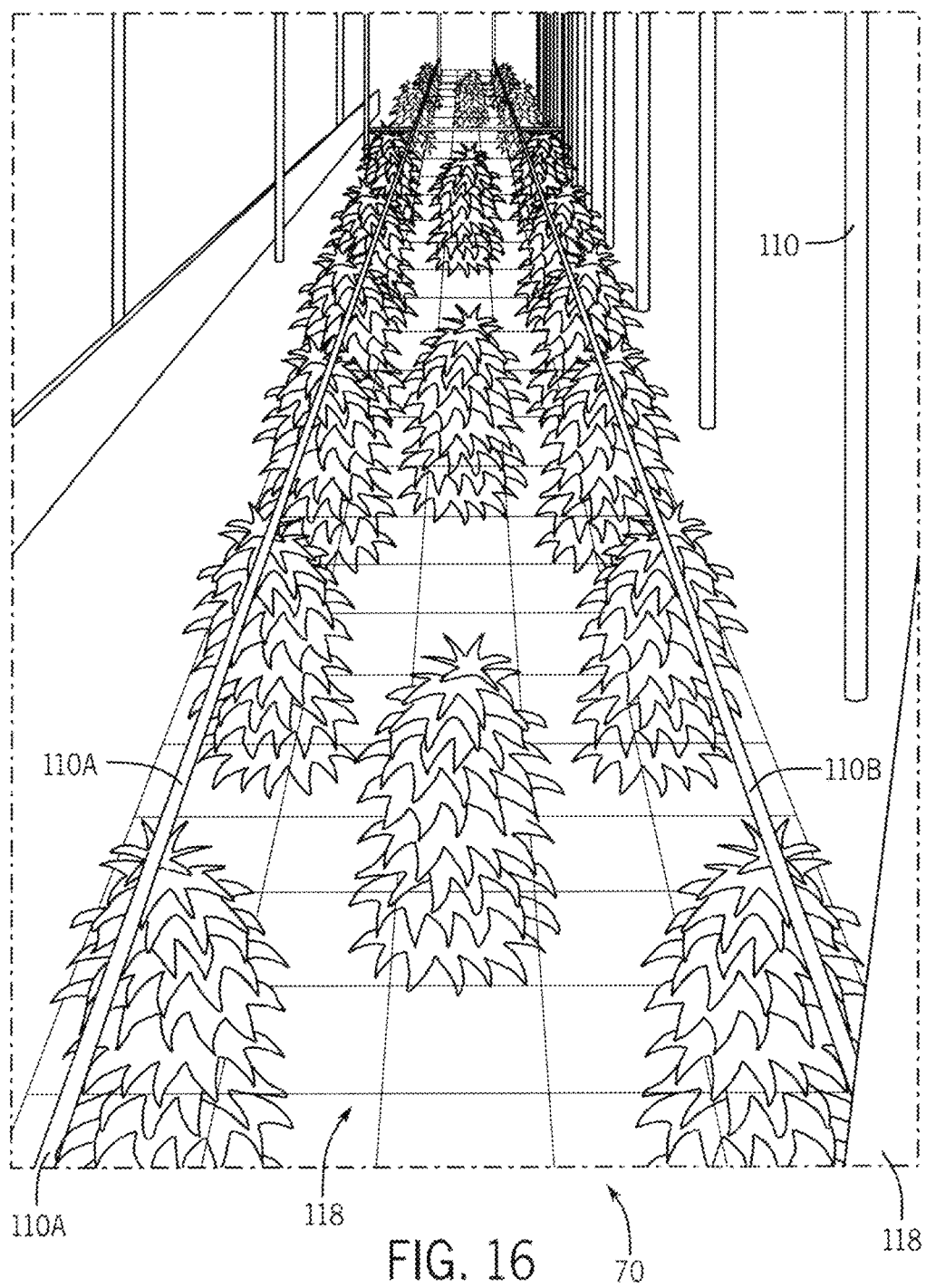
FIG. 16 illustrates an embodiment of the system of the invention, including a plant support mesh feature.

Referring to FIGS. 3-6 and 9, and 16, the individual hoop houses 18 of the downstream section 16 include plural, for example three (3) beds 70A-C. The beds 70, preferably have an elongated, rectangular configuration, with proximal and distal end walls 72 and 78 and side walls 74 and 76 surrounding a central planting area 80. The planting area 80 may utilize existing soils, on grade or built up, or preferably contains a particular planting media 82. The beds 70 have a thickness or depth of between 6 and 18 inches, preferably about 10 in. when 2×12 dimensional lumber is used for the walls 72-78. Media 82 substantially fills the planting area 80 to a depth of approximately 9 in. As is best shown in FIGS. 9 and 16, once the beds 70 are planted with seeds, seedlings, clones or other small plants 84, mulch (such as straw) may be applied to the beds 70, covering the planting area 80 between the individual plants 84. A stabilizing mesh 118 may then be applied, covering the planting area 80. Although the beds have been described as being constructed on the floor of a hoop house or the like, it is within the purview of the invention that the beds could be laid out on tables or other elevated structures containing natural or artificial soils, or liquid media, such as in trays, pods or the like.

In the preferred embodiment shown, paths exist between beds for movement of staff, equipment, material and harvested crops. However, the intra bed paths are small and tight so that maximum space inside the house is devoted to plant growth. Because of this, applicants' invention has a means of maintaining clear paths or rendering them clear during maintenance or harvest. The exemplary bed for growing Cannabis have a length of approximately 58 feet (17.67 meters), a width of 3 ft. (0.91 m.), and a bed height of about 1 ft. (0.30 m.). This yields a planting area 80 of approximately 180 square feet. The intra bed paths are approximately 18 in. (0.45 m.) wide. Ingress and egress occurs though one or both ends of the hoop house.

Figure 10:
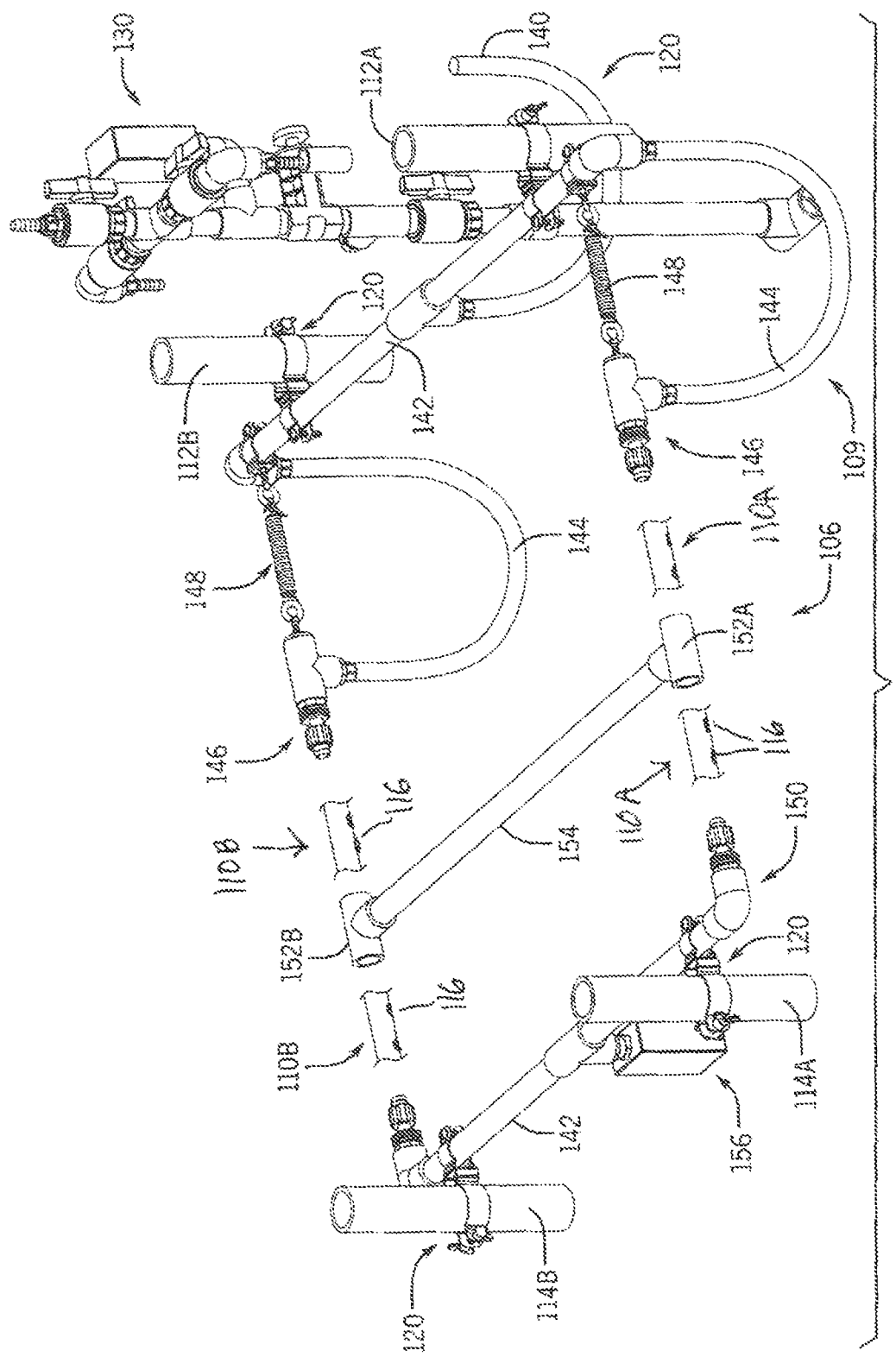
FIG. 10 is a perspective view of an embodiment of a gas distribution and emission assembly for use with a single planter, the assembly including a gas distribution manifold, a pair of gas emission lines communicatively connected to the manifold, and a middle support mechanism having a horizontal support mechanism disposed in a fixed position.

Significantly, each bed 70 includes a gas emission assembly 109. Referring also to FIG. 10, one embodiment of the gas emission assembly 109 includes a bed distribution manifold 130 and at least one gas emission line, tube or conduit 110. In the preferred embodiment, a pair of lines 110A-B is utilized. The gas distribution manifold 130 is disposed at the first or proximal end of the bed 70, nearest the up and midstream sub systems 12 and 14, and receives gas therefrom. Referring again to FIG. 3, for house 18 having plural bed 70, the manifold 130 for each bed may receive gas from a hoop house distribution splitter or manifold 132 (connected to the main gas line 28A) vi a supply lines 134. Lines 134 are preferably buried under the soil. Emission lines 110 are elongated and extend essentially the entire length of each bed 70. Lines 110 A and B are disposed a predetermined distance apart, preferably 12 in., the lines also being equally spaced from the sides of the bed 70. The lines 110 are tubes having a central gas lumen and a plurality of emission apertures which emit $CO_2$ gas to the plants 84. The lines 110 are preferably constructed of a flexible plastic material and have an outside diameter of ⅝ in. The apertures are preferably circular and have a diameter of between ¼ to ¾ in. The lines 110 are supported at each end by end posts 112 and 114. The line 110 ends are connected to the posts 112 and 114 via at least one tension adjustment assembly 148 at each line 110 end. The tensioners 148 are preferably spring bias type tensioners. Tensioners 148 may be disposed at only one, or both ends of each line 110. In the embodiment of FIG. 10, the lines 110 are indirectly connected to the posts 112 and 114 via lateral members 142. Direction connection may be made in the alternative. The lateral members 142 also function to distribute and circulate gas. The proximal member 142 is shown to be communicatively connected to the manifold 130 via gas line 140. Proximal member 142 is then connected to each line 110A-B via flexible lines 144 and coupler assemblies 146. In view of the length and flexibility of the emission lines 110, at least one lateral mid support assembly 107 is disposed along the length of the lines 110, typically at the mid or half way point of the length of the lines 110. The lateral support preferably extends below and supports both lines 110A-B for ease of adjustment. A $CO_2$ gas line pressure sensor 156 is preferably connected in line with the assembly 130, preferably at the downstream end. This embodiment of the assembly 130 utilizes a continuous loop lumen from end to end. Alternatively, the gas lines 110 A/B may terminate at the distal end whereby all gas is emitted from the line apertures and does not circulate.

Figure 38:
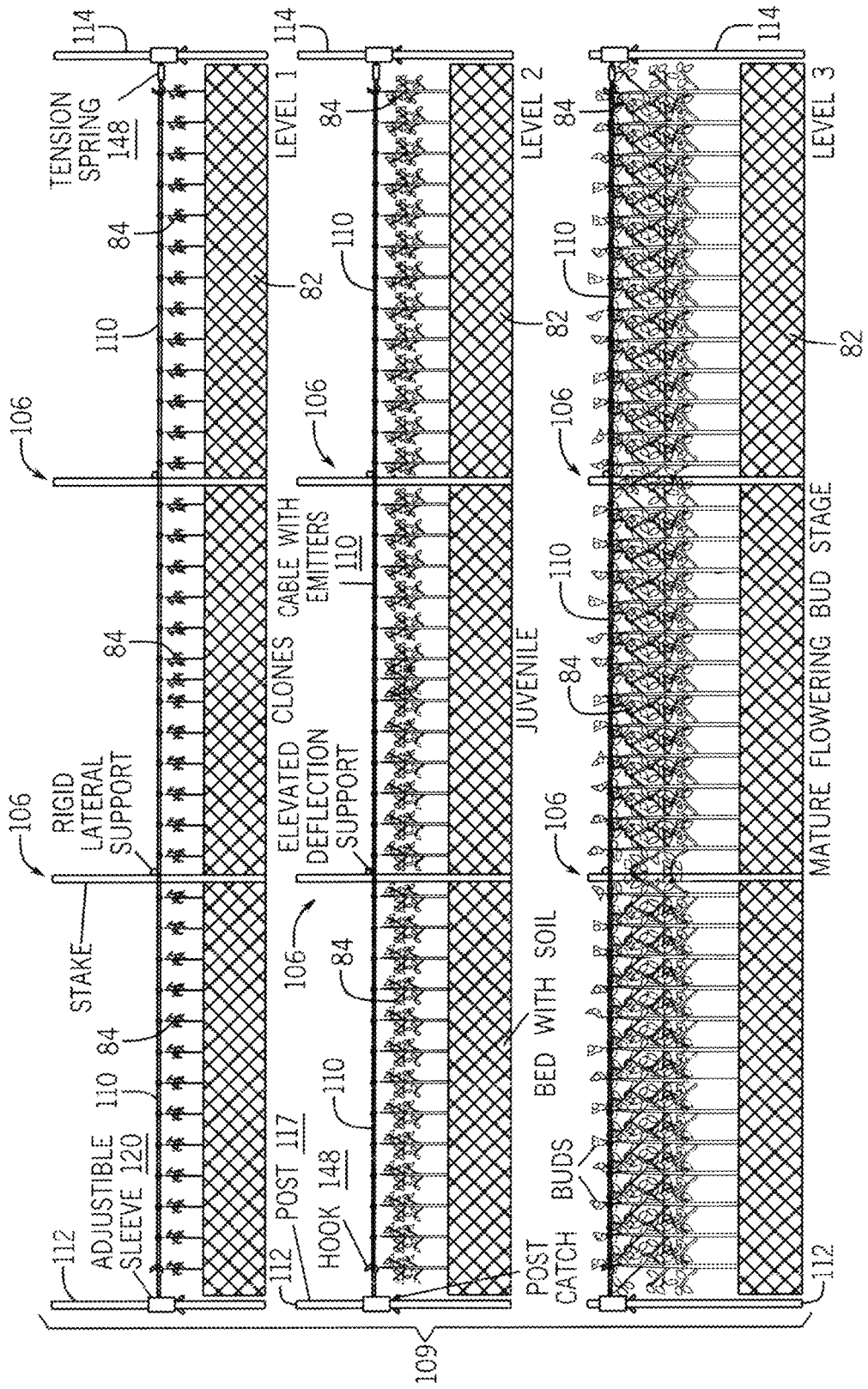
FIG. 38 illustrates the adjustability function and features of the system of the invention during the life cycle of plants processed from clones, juvenile, to mature flowing bud stage for Cannabis.

Importantly, the gas emission assemblies 109 are height adjustable so that the lines may be disposed close the plants 84 as they grow. Referring also to FIG. 38, typically, the lines 110 will be oriented just above the tops of the plants. In the embodiment of FIG. 10, the height adjustment means includes an adjustable strap 120 coupled to each end post 112-114. The mid lateral supports 107 are similarly, adjustably supported by posts (not shown). The straps 120 each have two (2) strap members, one for attaching to a vertical post 112/114, and one for attaching to a horizontal lateral member 142, and the two strap members are connected by a swivel member whereby they may rotate in a position other than perpendicular (as shown). This permits adjustment of the entire gas line assembly either flat (as shown) or tilted, during height adjustment. This is beneficial when plants grow disproportionally in the beds 70.

Figure 11:
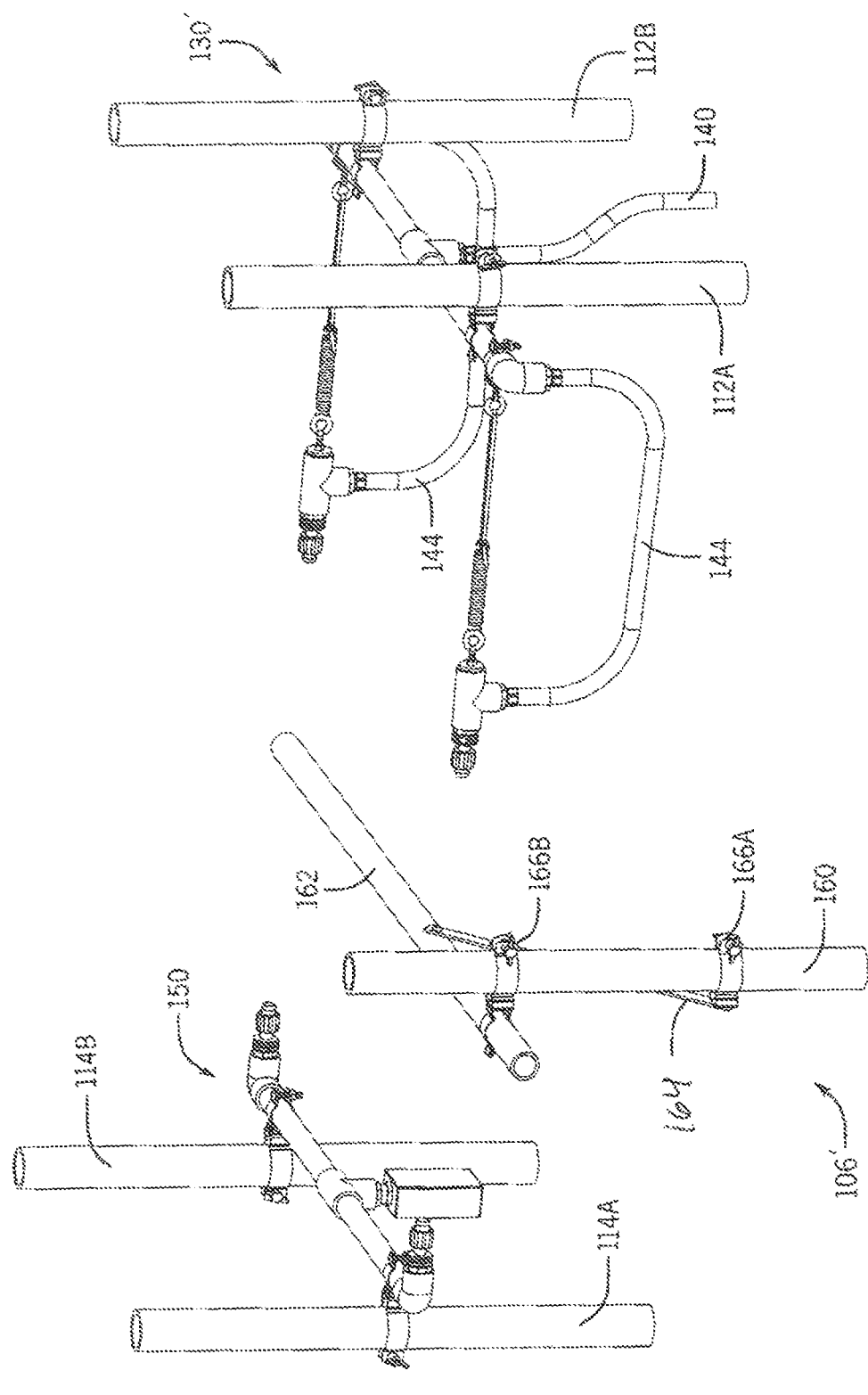
FIG. 11 illustrates an alternative embodiment of the gas distribution and emission assembly, including an alternative embodiment of the middle support mechanism, including a cantilevered arm disposed in a fixed position.
Figure 12:
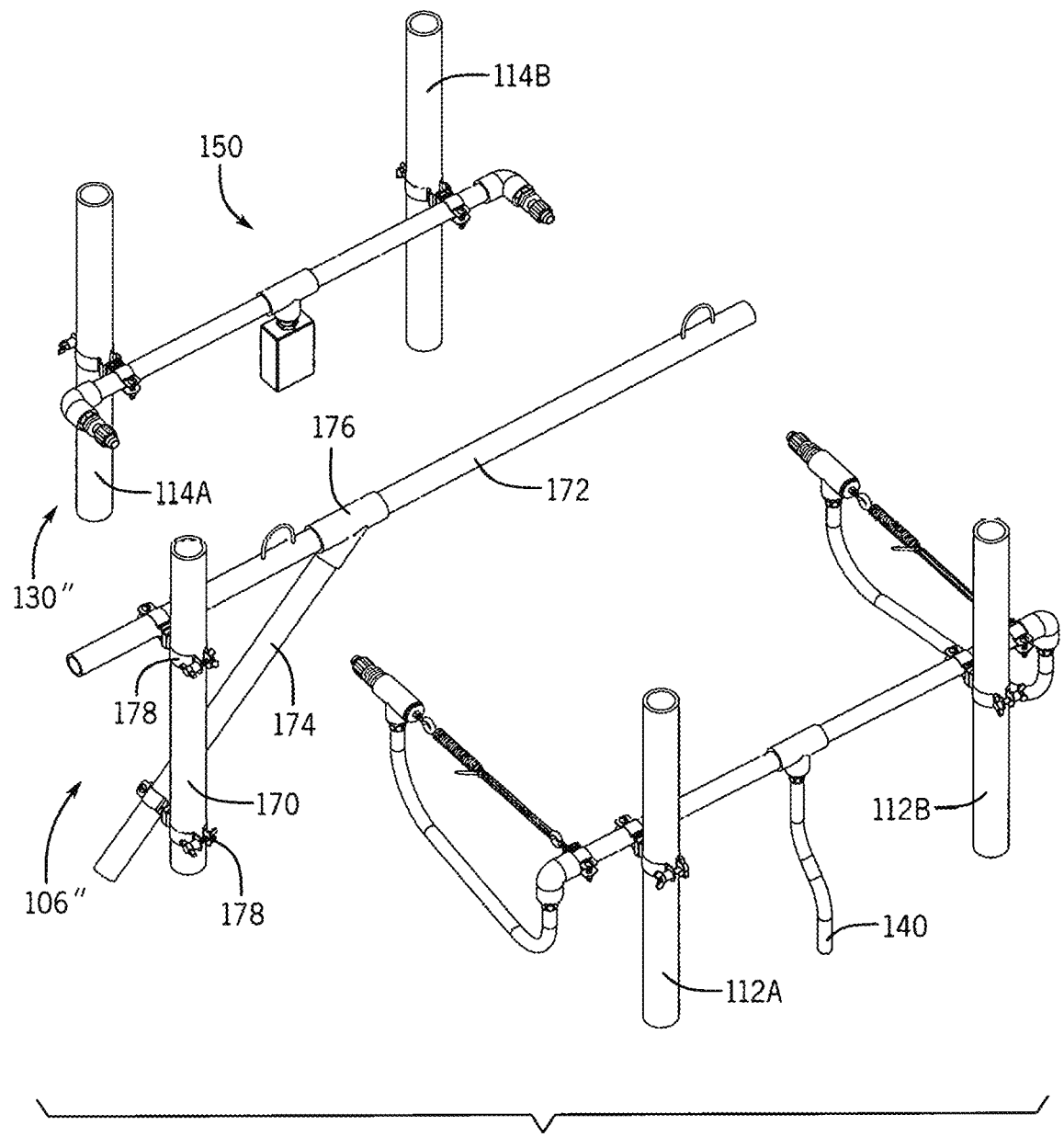
FIG. 12 is illustrates another alternative embodiment of the gas distribution and emission assembly, including an alternative embodiment of the middle support mechanism, including another embodiment of a cantilevered arm.

Further embodiments of the height adjustable distribution and emission assembly are shown in FIGS. 11 and 12. Referring first to FIG. 11, the assembly 130' (prime) comprises substantially similar elements, with the exception of the mid lateral support 106' (prime) which has a vertical support 160, a cantilevered lateral support 162, and an angle member 164 adjustably coupled to the vertical member 160 via straps 166A/B. The straps 166 are also pivotable like straps 120 shown in FIG. 10. This embodiment of the assembly 130' permits pivoting of the members out of the way of the paths between beds during maintenance and harvest. In FIG. 12, the assembly 130' (double prime), again has substantially similar components, except that the mid lateral support has a vertical member 170, a horizontal member 172, an angle member 174 connected to the vertical member by a fitting 176, and height adjustable coupling straps 178.

Figure 15:
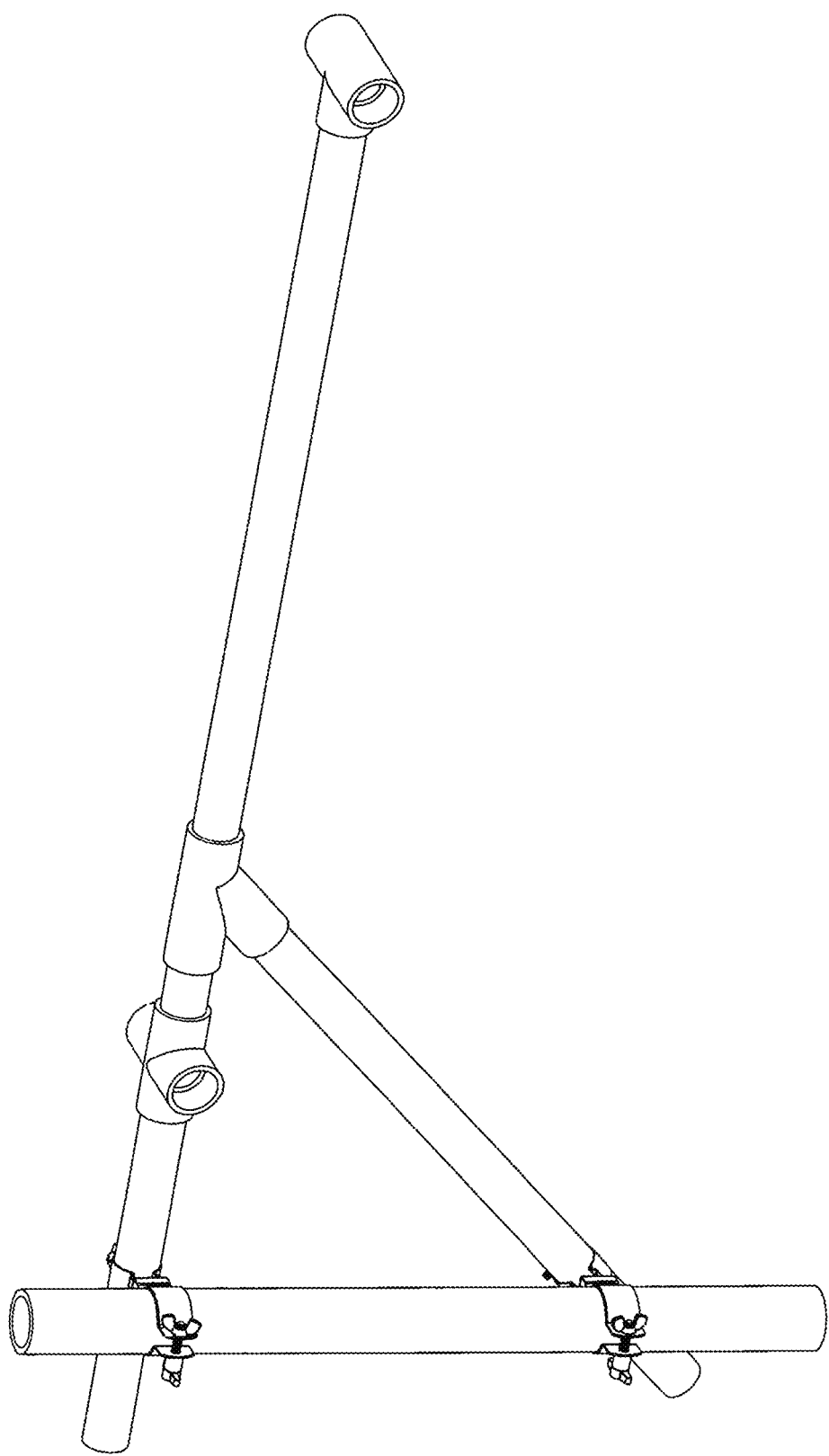
FIG. 15 illustrates an embodiment of a cantilevered arm including a crossover manifold center support solid brace.
Figure 17:
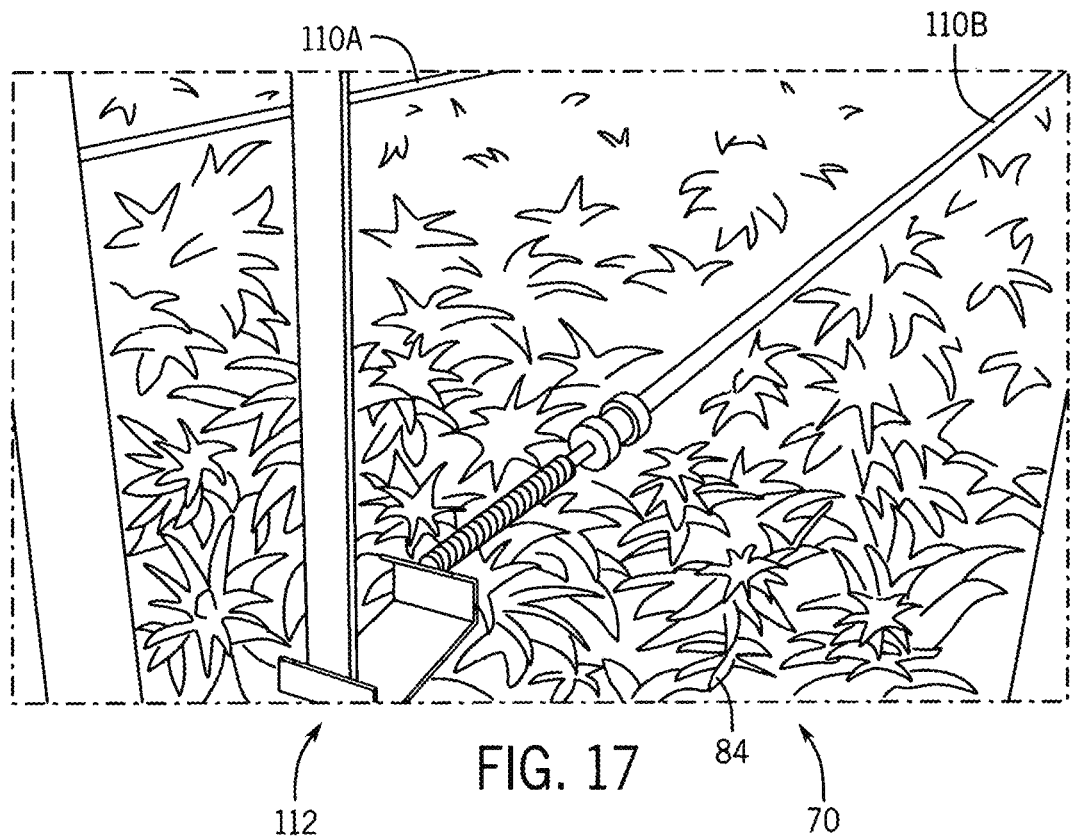
FIG. 17 shows an embodiment of a vertically adjustable gas emission line tensioning support.
Figure 18:
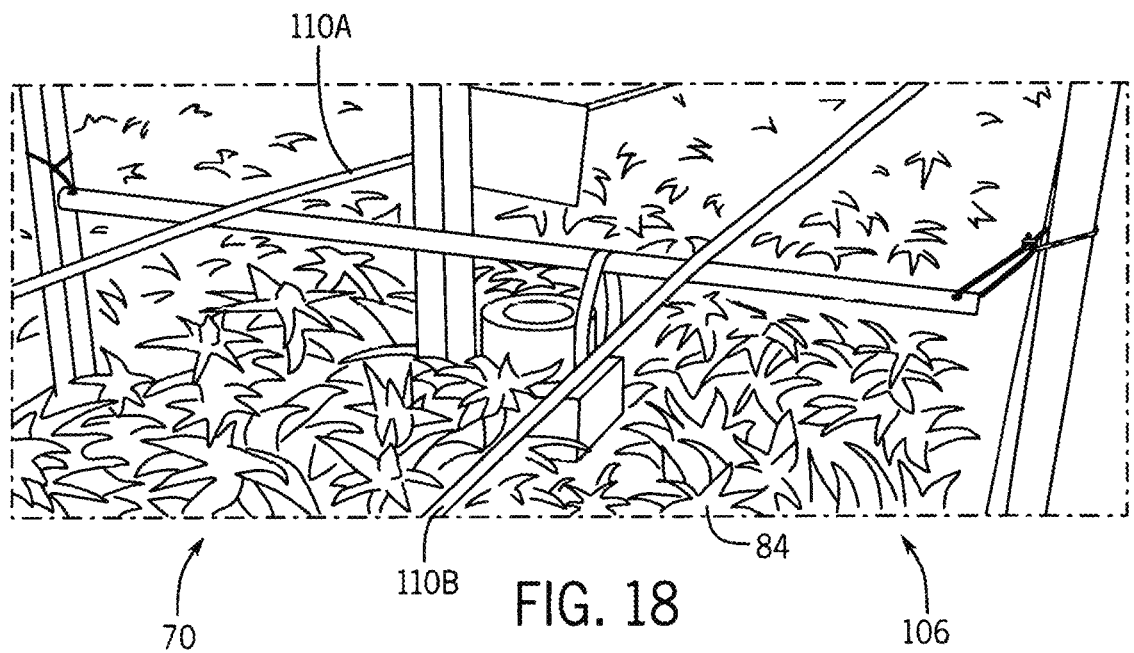
FIG. 18 shows an embodiment of a horizontal support mechanism.

FIGS. 13 and 14 are other view of the support shown in FIGS. 11 and 12, respectively. FIGS. 15 and 18 show further alternative embodiments of the height adjustable midsection line support assemblies. FIG. 17 shows an alternative of a height adjustable line 110 end support.

Figure 19:
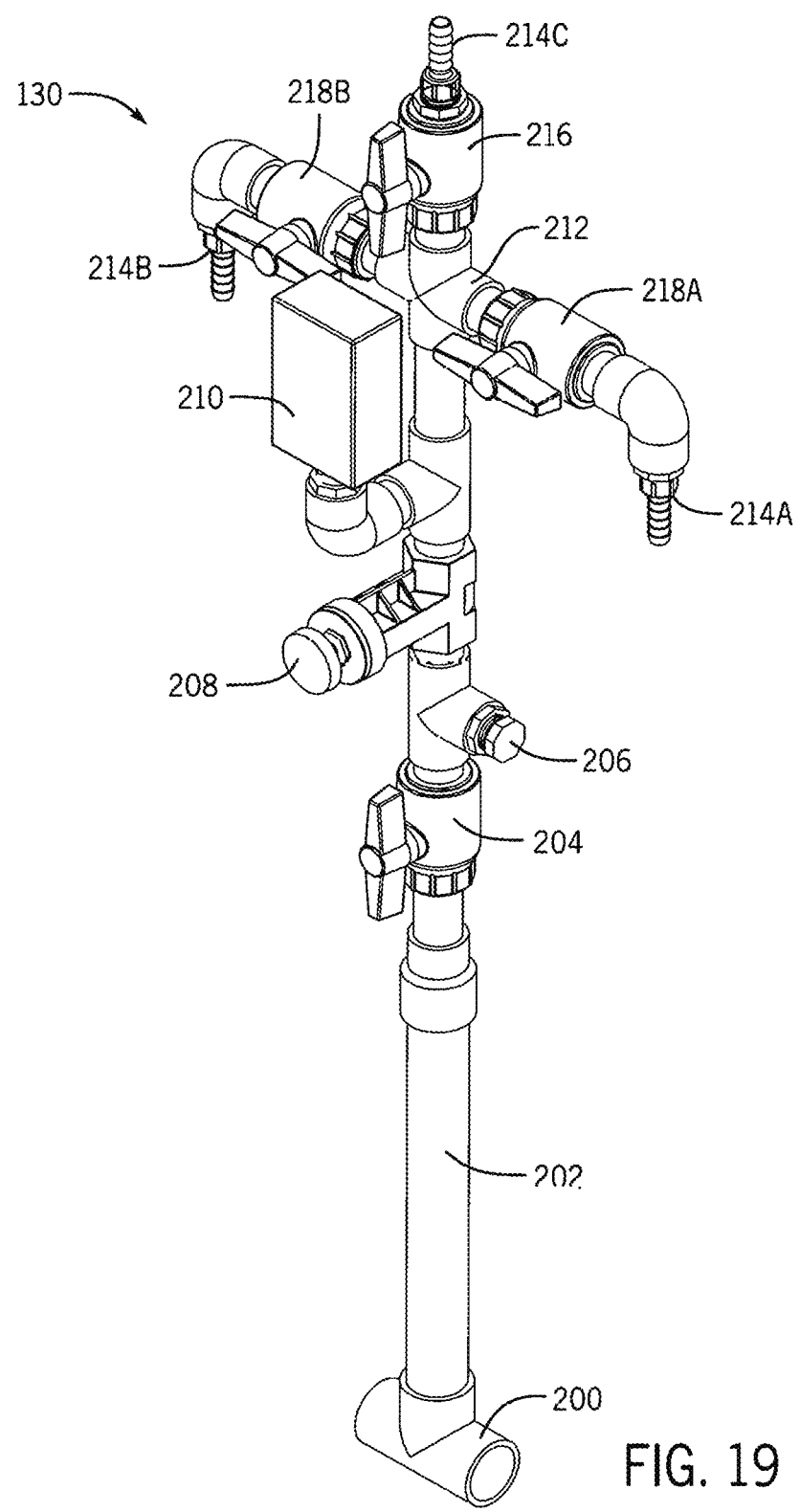
FIG. 19 is a more detailed illustration of an embodiment of a gas distribution manifold including a bed shut off feature.

FIG. 19 shows further details of an embodiment of the gas supply manifold 130 shown also in FIG. 10. The manifold 130 comprises a gas input tee 200, a PVC riser 202, a PVC ball valve 204, a gate valve 206, a PVC pipe 208, a pressure transducer ionics 210, a PVC cross 212, a pair of hose barbs 214 A&B, a PVC ball valve 216, and a pair of PVC ball valves 218 A&B. The three flow controls 214A/B and 216 permit precise adjustment of $CO_2$ delivery to the plural beds or bays 70.

Figure 20:
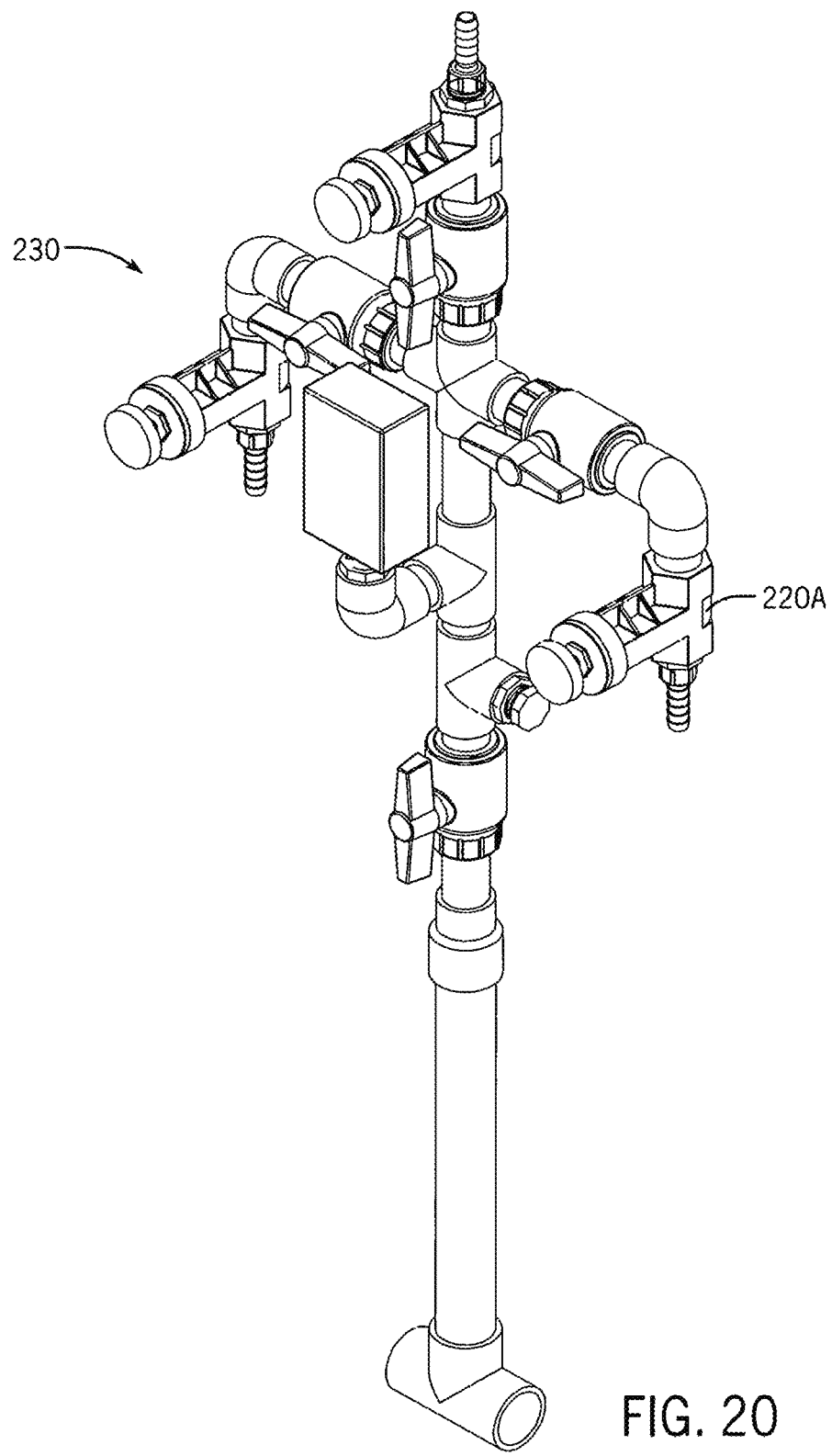
FIG. 20 is a detailed illustration of an alternative embodiment of the gas distribution manifold, including bed shut off and adjustable flow.
Figure 21:
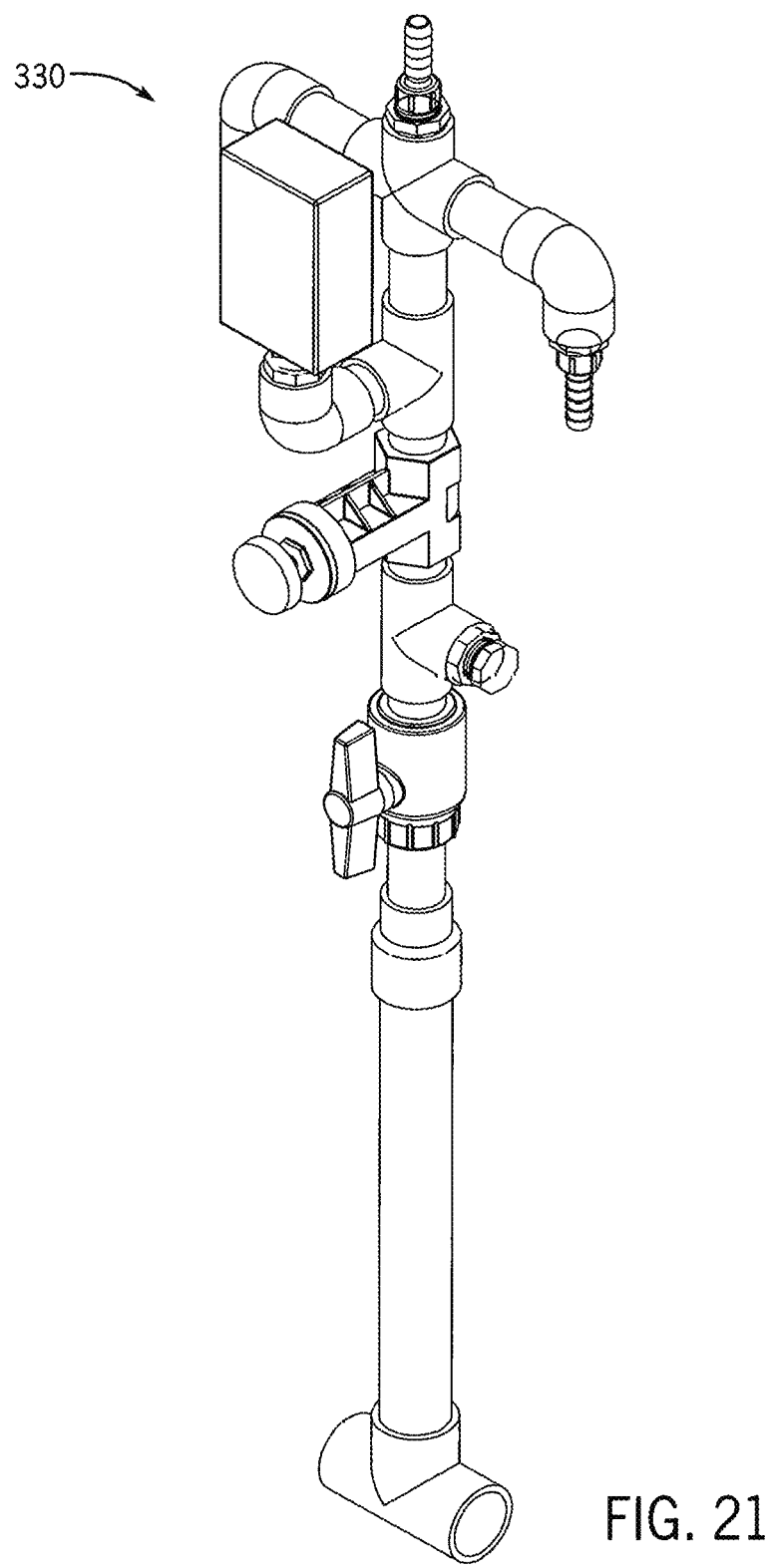
FIG. 21 is a detailed illustration of another alternative embodiment of the gas distribution manifold, with more basic features.

FIG. 20 shows an alternative embodiment of the manifold 230 with substantially similar features to the manifold 130, except that a pair of gate valves 220 A and B are added above hose barbs 214 A-D. The manifold 330 embodiment shown in FIG. 21 is a basic embodiment again similar to manifold 130, except that it lacks the pair of PVC ball valves 218 A&B.

Figure 22:
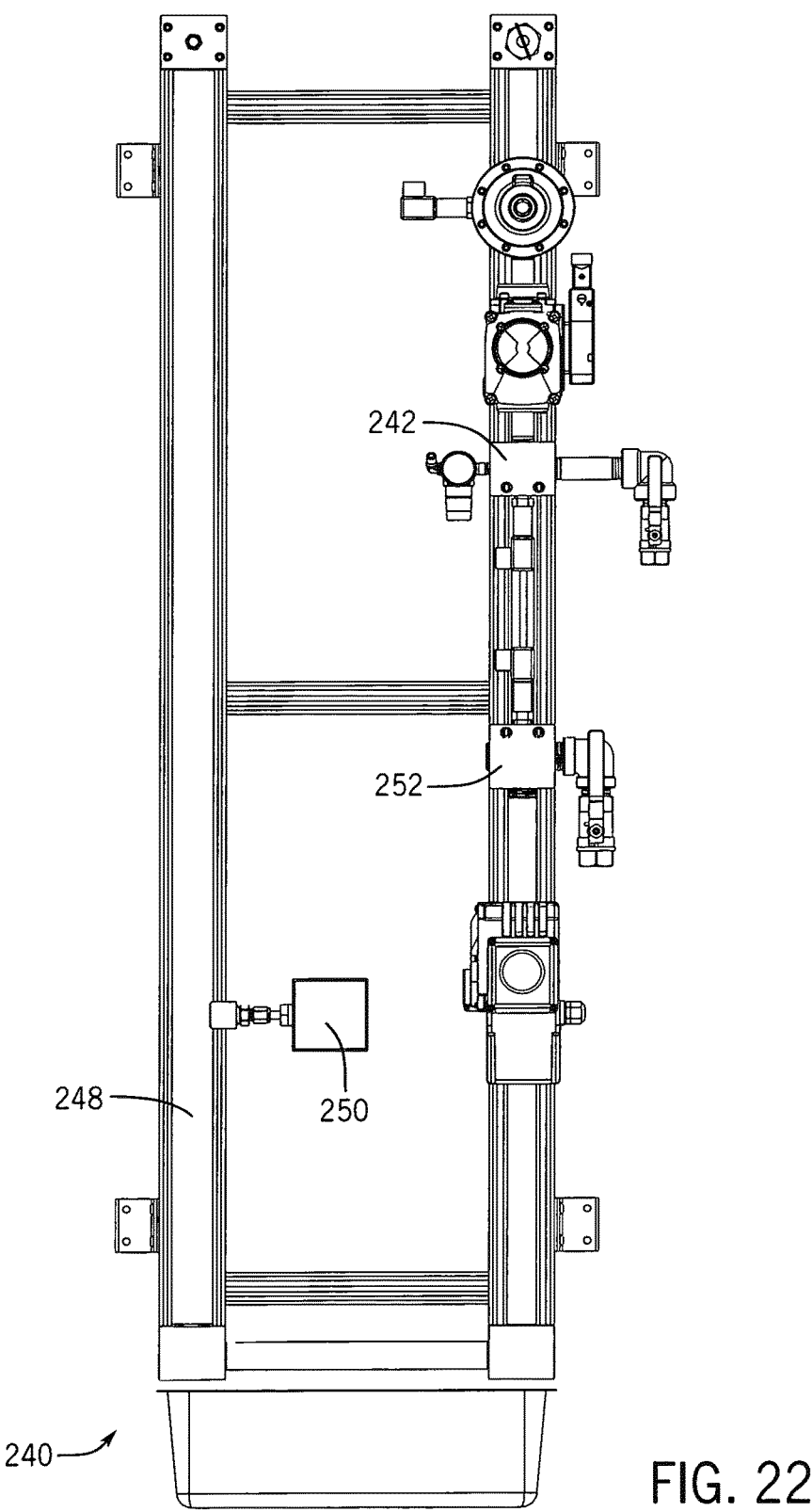
FIG. 22 is a front view of an embodiment of a gas control manifold assembly, which is part of the midstream aspect of the invention.
Figure 23:
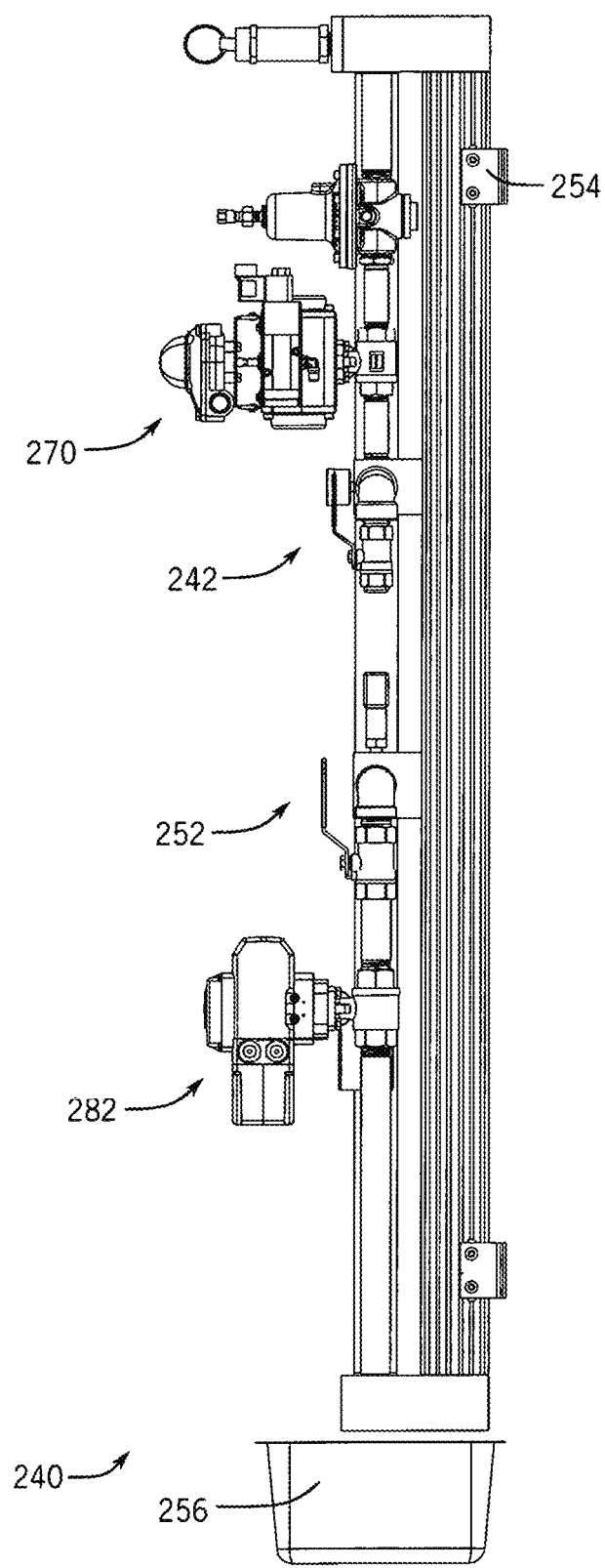
FIG. 23 is a side view of the gas control manifold assembly of FIG. 22.
Figure 24:
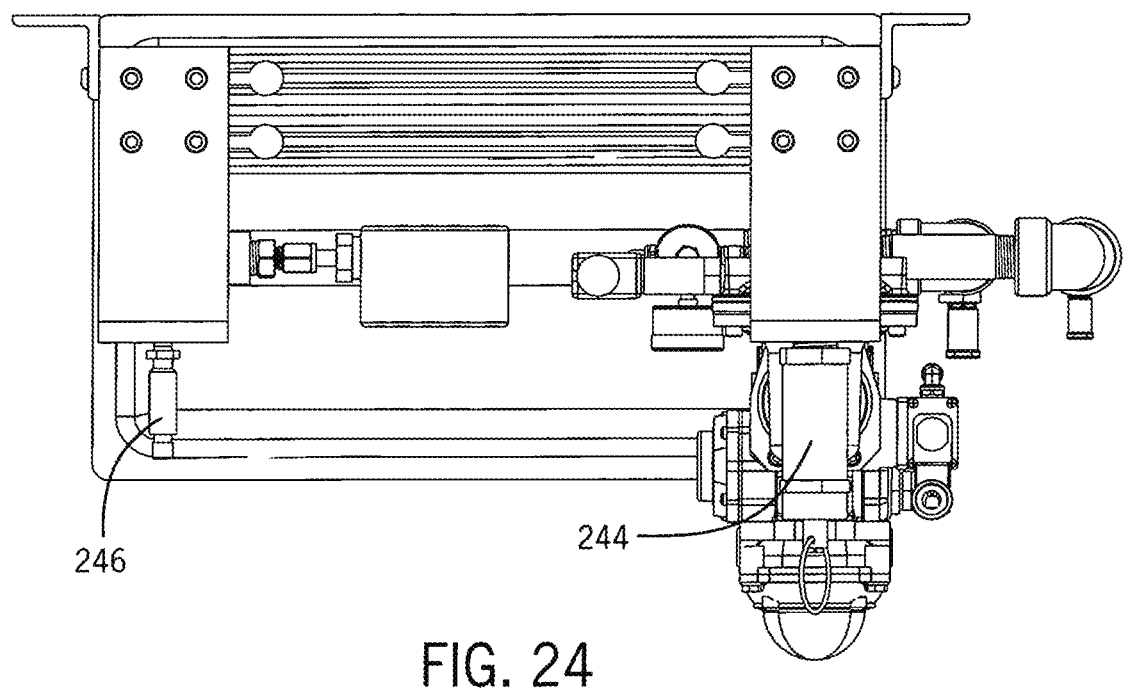
FIG. 24 is a top view of the gas control manifold assembly of FIGS. 22 and 23.
Figure 27:
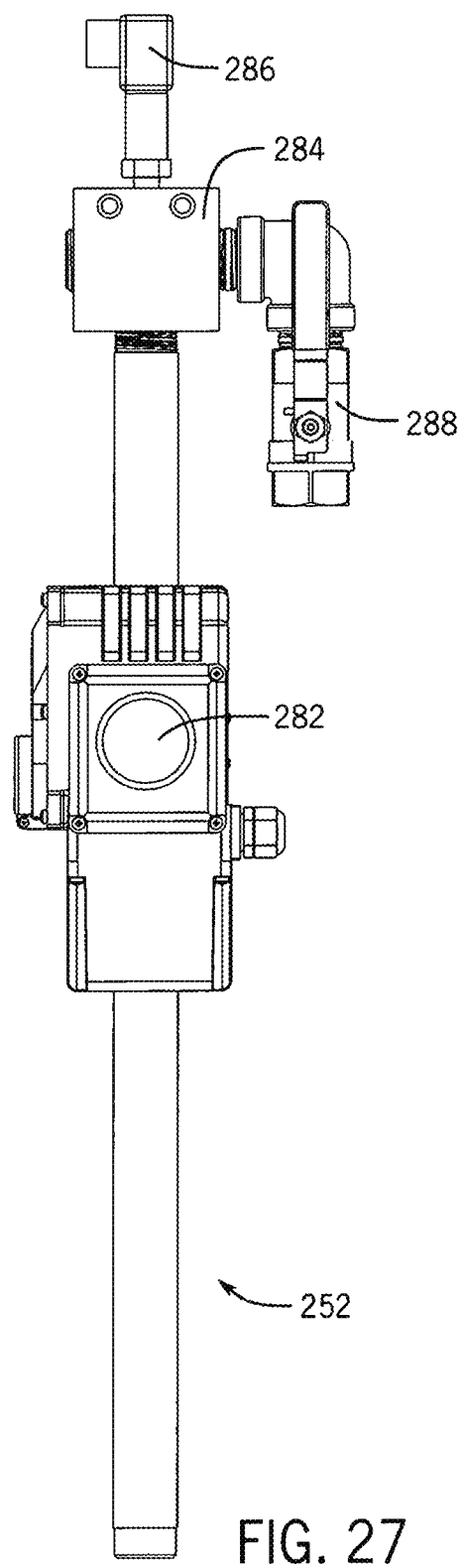
FIG. 27 is a front view of an embodiment of a gas output valve assembly.
Figure 28:
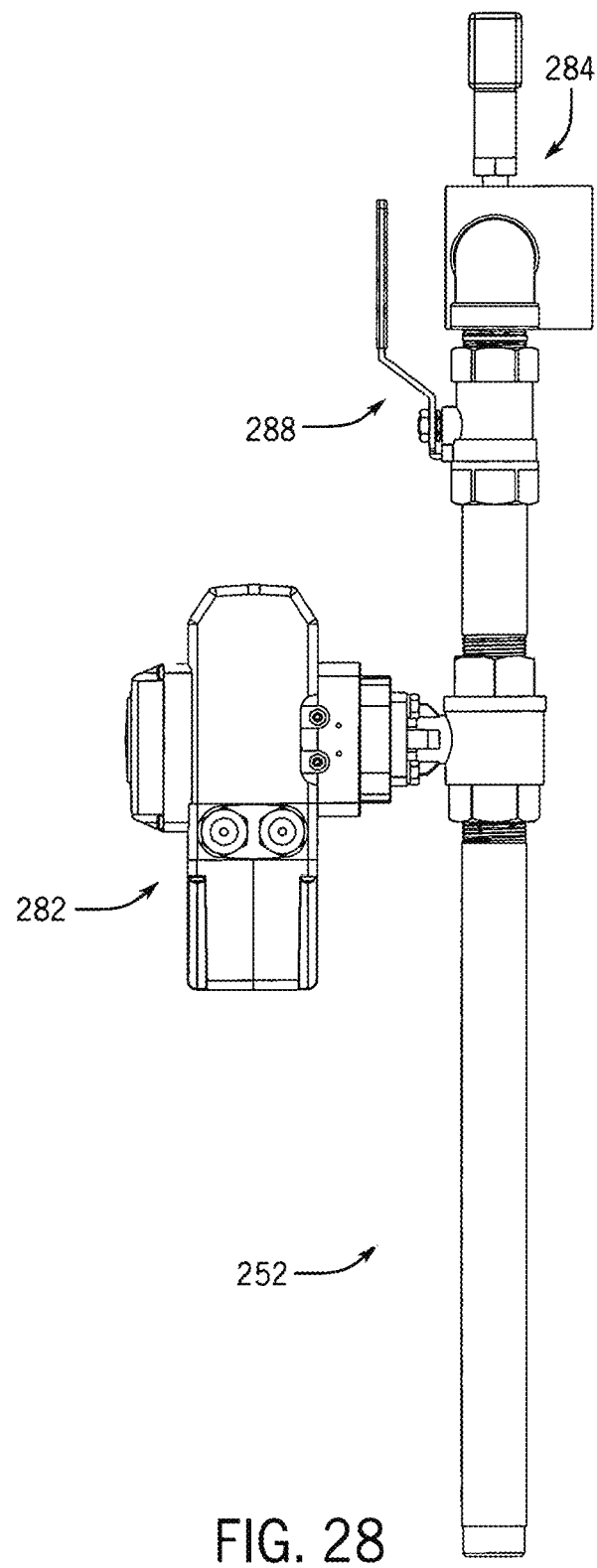
FIG. 28 is a side view of the gas output valve assembly.

Returning to the discussion of the midstream subsection 14, an embodiment of the gas valve assembly 50 is shown in FIGS. 22-28. Referring first to FIGS. 22-24, the gas valve assembly 50 comprises a manifold assembly 240, an input valve assembly 242 connected to the manifold assembly 240 and an output valve assembly 252 also connected to the manifold assembly 240. Referring to FIGS. 22-24, the manifold assembly 240 includes the input valve assembly 242, a pressure-relief valve 244, a temperature sensor 246, a flow tube assembly 248, a flow meter 250, the output valve assembly 252, a mounting bracket assembly 254, and a drip pan 256. Referring to FIGS. 25 and 26, the input valve assembly 242 includes a ball valve 262, an input manifold 264, a pressure transducer 266, an air regulator 28, a ball valve 270, a gas regulator generant 272, and a pressure transducer 274. Referring to FIGS. 27 and 28, the output valve assembly 252 includes a ball valve and actuator 282, an output manifold 284, a pressure transducer 286, and a ball valve 288.

Figures 29, 30:
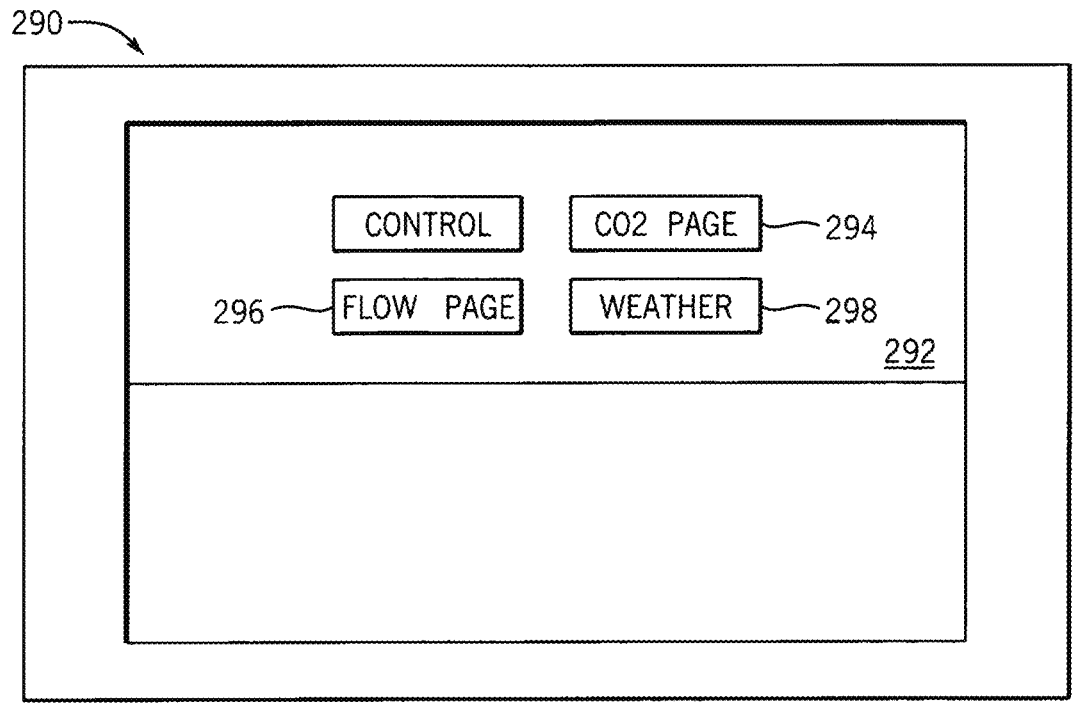
FIG. 29 shows an embodiment of a user interface control panel home page.
FIG. 30 shows an embodiment of the user interface control panel CO2 status page.
Figure 31:
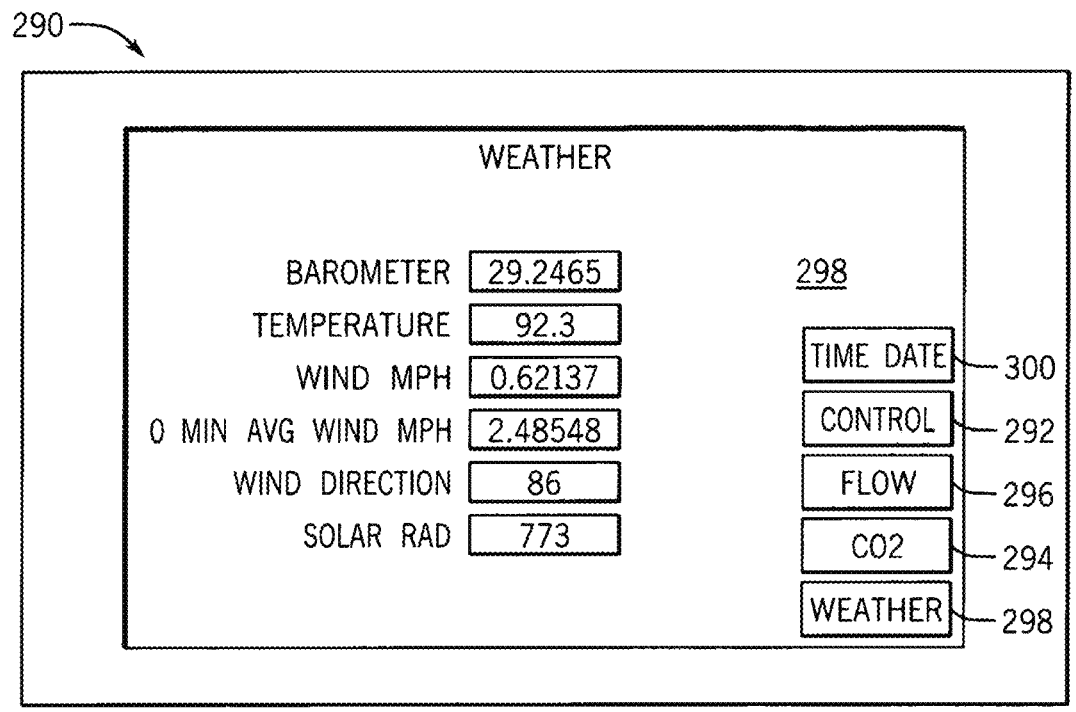
FIG. 31 shows an embodiment of the user interface control panel weather status page.
Figure 32:
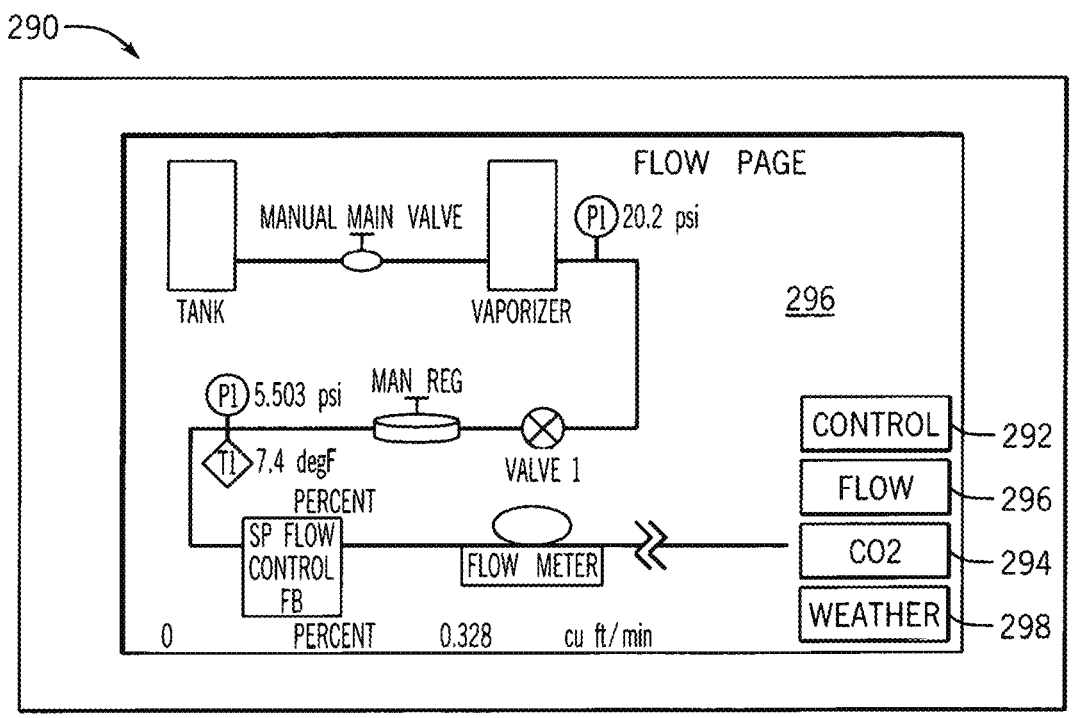
FIG. 32 shows an embodiment of the user interface control panel gas flow status page.
Figure 33:
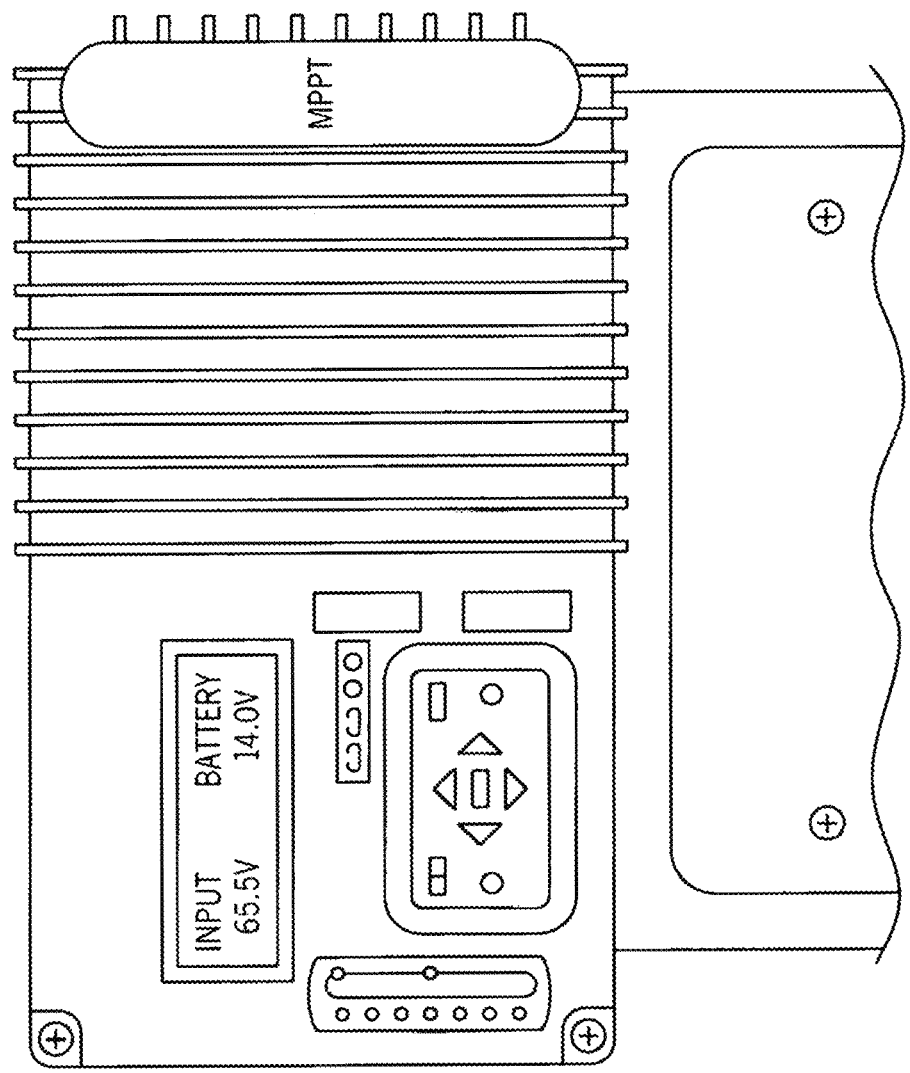
FIG. 33 shows an embodiment of a power control module of the invention.

Further in the midstream subsection 14, and with reference to FIGS. 29-38, an embodiment of the electronic control assembly 52 comprises a user display and input device 290, preferably in the form of a touch screen controller. An example device is provided by Phoenix Contact of Middletown, Pa. USA. The electronic user control system initially presents a home screen or page 292, shown in FIG. 29, with $CO_2$ status 294, $CO_2$ flow 296, and weather 298 options. Referring also to FIG. 30, the $CO_2$ status display shows the $CO_2$ concentration, house temperature, and humidity for each of plural houses 18A-x. It also has buttons or switches 292-298 for moving to the other screens of the system. Referring also to FIG. 32, the $CO_2$ flow screen shows the status of the tank, vaporizer and other gas flow parameters, and screen switches. This can be utilized to detect gas line leaks at any part of the system. Referring also to FIG. 31 the weather page 298 shows the operator barometric pressure, temperature, wind speed and direction, and light intensity to permit adjustment of $CO_2$ delivery. FIG. 33 shows an embodiment of the power control assembly of the system 52.

Figure 34:
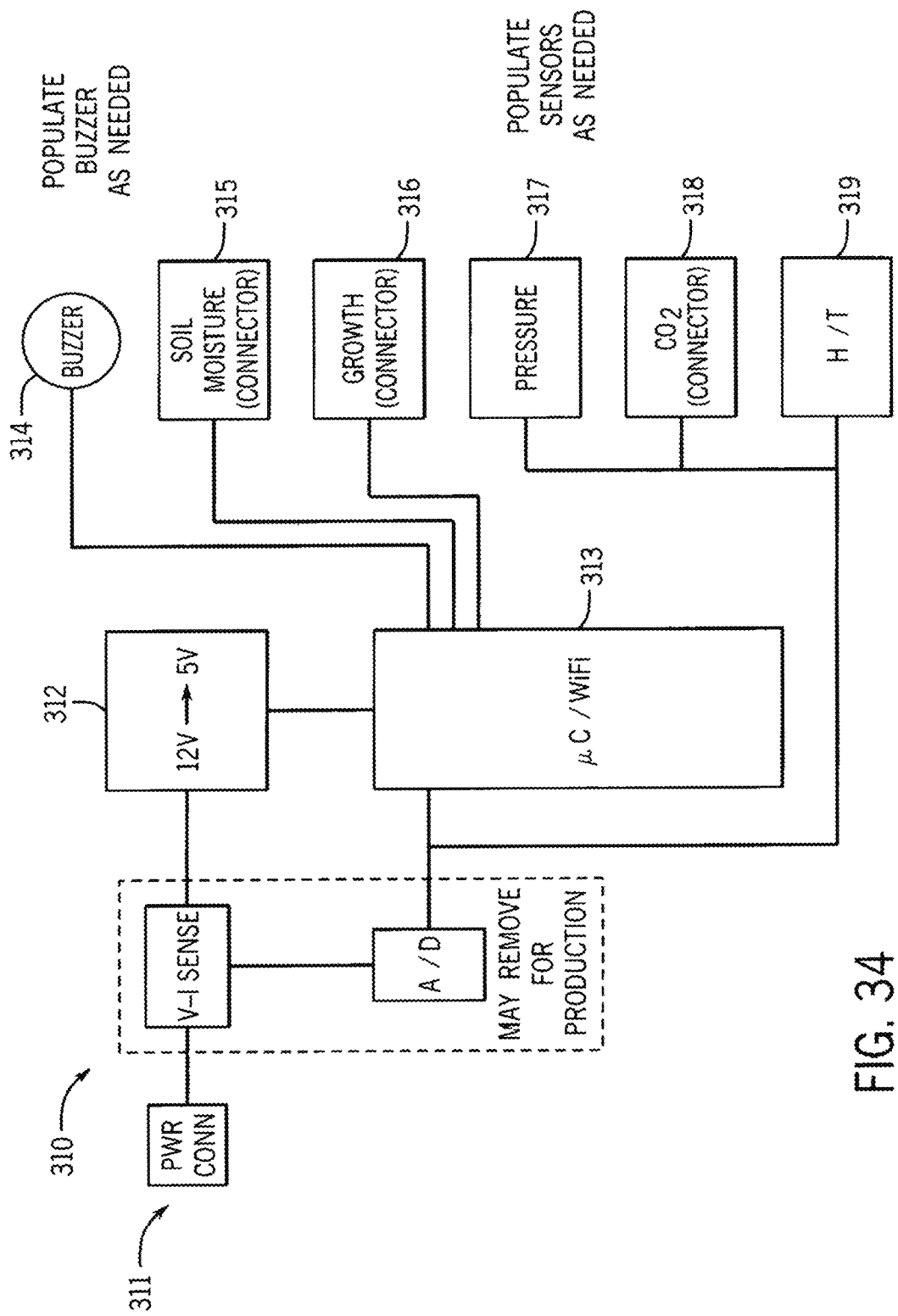
FIG. 34 is a diagram showing an embodiment of a sensor module control and communication system of the invention, including WIFI, capability.
Figure 35:
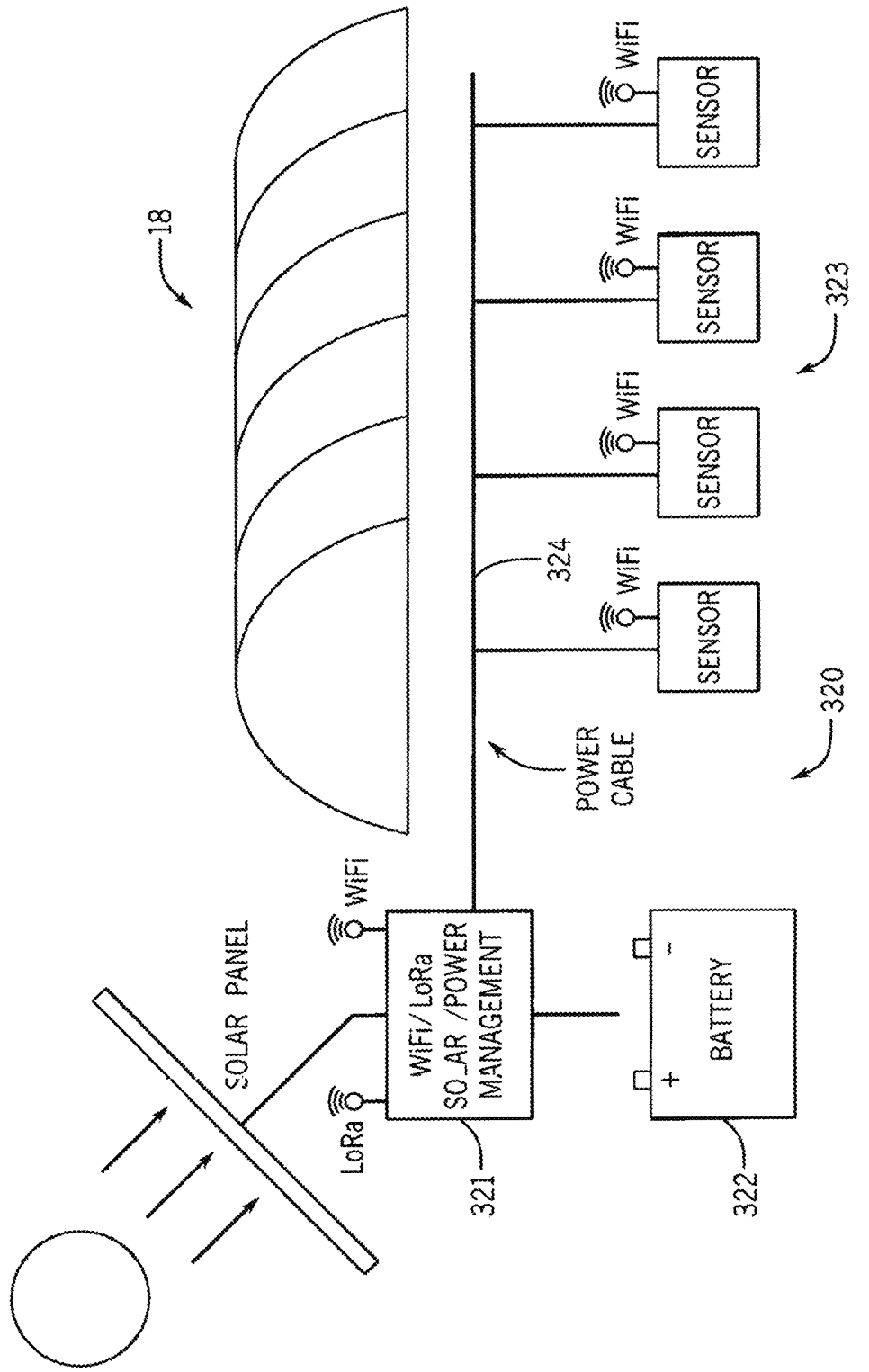
FIG. 35 is a diagram of an embodiment of a hoop house electrical and communication system.
Figure 36:
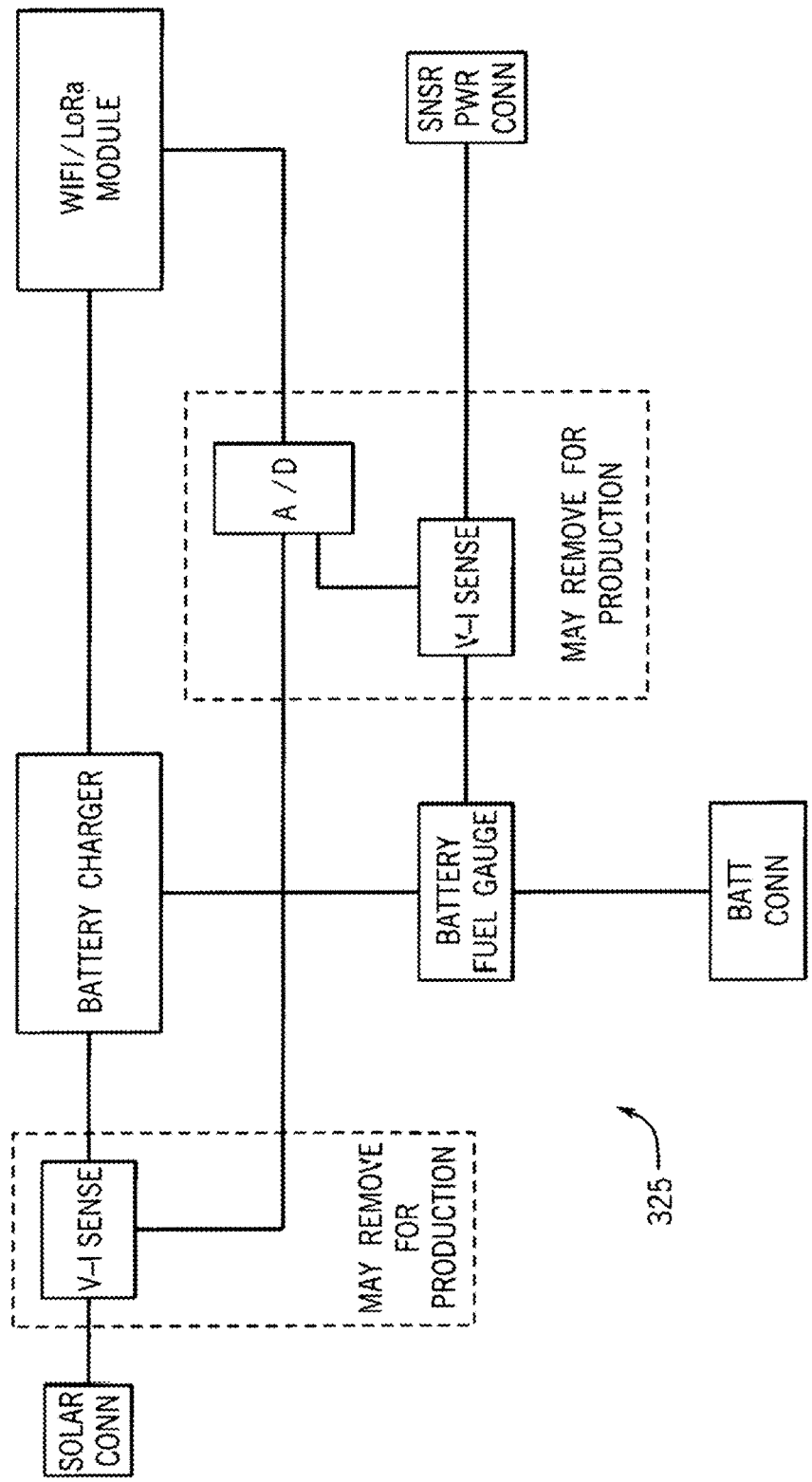
FIG. 36 is a diagram of an embodiment of a LoRa, WIFI, battery and power management module of the invention.

FIG. 34 is a diagram of an embodiment of a sensor module control and communication system 310 of the invention, including WIFI capability. The system 310 includes a power connector 311, a voltage converter 312, a WIFI module 313, an alarm 314, a soil moisture module 315, a plant growth module 316, a $CO_2$ pressure sensor 317, a $CO_2$ concentration sensor 318, and a high temperature sensor 319. FIG. 35 is a diagram of an embodiment of a hoop house electrical and communication system 320 including a power management module 321, a battery module 322, and an array of sensors 323. Each sensor in the array, preferably senses temperature, humidity, and $CO_2$ concentration. Significantly, the multi sensors 323 are disposed on the height adjustable midpoint support assembly 106 so that they are positioned in close proximity to the top of the growing plant 86 canopy for optimum sensitivity to plant $CO_2$ needs. They receive power via a power cable array 324 for security, particularly in view of $CO_2$ safety. They are shown to communicate data to the controller 52 via WIFI or other wireless transmission, but may be hard wired also. FIG. 36 is a diagram of an embodiment of a LoRa, WIFI, battery and power management module 325 of the invention.

Figure 37:
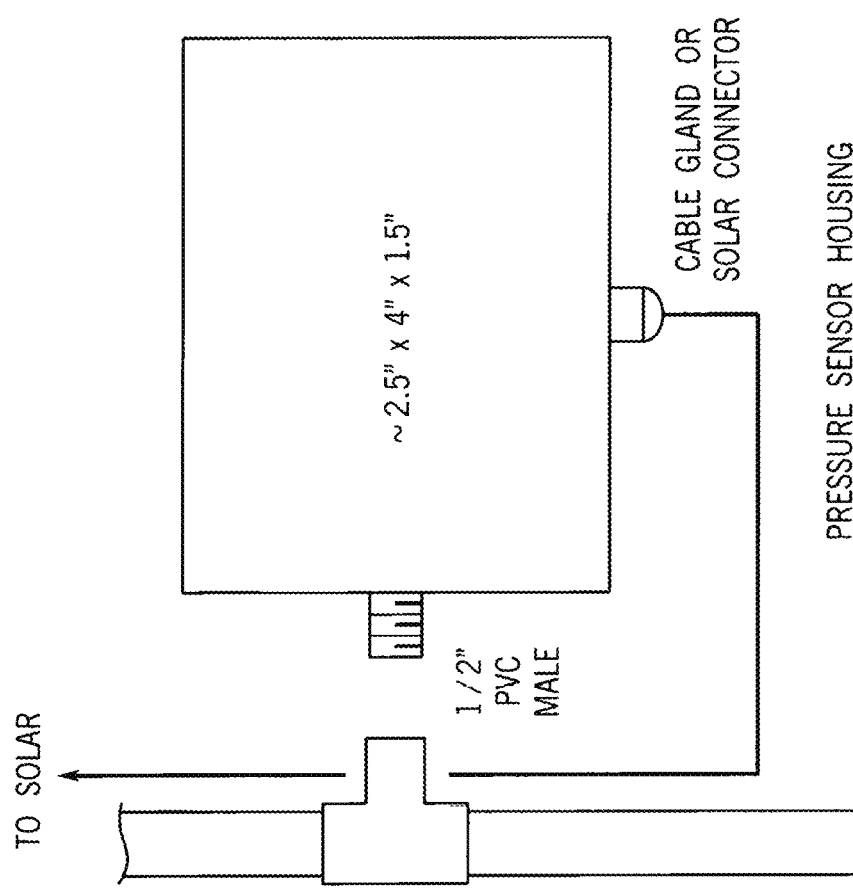
FIG. 37 illustrates an embodiment of a pressure sensor housing of the invention.

FIG. 37 illustrates an embodiment of a pressure sensor housing of the invention.

Returning to FIGS. 10-12, the method of constructing the height adjustable distribution and emission assemblies 130 (and for using such assemblies) for each bed 70 is discussed. Posts 112 and 114 are securely anchored to the ground at each end of the beds 70. The posts 112 are constructed and arranged such that they will not bend, even when inward pressure is applied to the top of the post 112/114. A wire is extended the length of the row and attached to the corresponding post 112/114 at the far end of the bed 70. In one alternative embodiment, the wire element is a self supporting gas pipe. In another embodiment, the wire is the emitter line 110. The wire is connected on each end to an adjustable sliding sleeve that can slide up or down on the post. The sleeve has the ability to lock or maintain to a fixed elevated position, that is height on the post, and is easily repositioned upwards or downwards to a new position as needed. The wire is tensioned generally tautly using any number of commercially available tensions like a ratchet strap, inducing minimal deflection down the length of the row from the far end post which also has the same slider arrangement. Cross members or aerial ties can be used intermittently down the row to support deflection in the wire emitter run as desired, for example a 3-20 foot spacing to create a scallop effect down the length of the row, but generally supporting the emitters at an equally desirable height at or just above the top of the plants from one end of the bed to the other.

Emitters (not shown) and gas supply are supplied down the length of the wire/bed row. Emitters are positioned just above the canopy of the crop. Returning to FIG. 38, in use, as the crop 84 grows, the sliders at each end are moved up the posts as need to accommodate plant growth and to stay clear of the introduction of mesh trellis in the bed as is commonly known and used in the cultivation of cannabis or other such crops. Rigid to semi-rigid emitters are suspended just at or above the leafy canopy of a single plant or row of the crop. Upward mobility of the device is permitted to correspond to plant growth. They may be removed or moved out of the way to facilitate harvest and other agronomic functions like the introduction of mesh.

The system of the invention can be extended to the control of pests such as mites. The infested plants can be tented with a sealed plastic fabric cover and the gas is introduced for a period of around 15 minutes at higher concentrations above 10,000 PPM to organically kill all of the pests on the plants. Multiple plants in that garden can be tented at once and a whole group can be cleansed of pest at once either through a single tent or multiple tents.

The system may incorporate applicants' multi-media irrigation technology to accommodate conductance of a variety of liquids, gases, aerosols, volumes and flow rates. Gaseous conductance can include thermally treated air, such as cooled air drawn across an ambient vaporizer present, and reverse flow direction for odor control and humidity control practices. Curtains can be provided between the rows of the system, to isolate vectoring and maintain a variety of gaseous mixtures between adjacent rows. Further, a pass through enclosure with gaseous enrichment from the system can even be provided to suppress vector transmission as people, equipment and supplies enter and leave the production area.

Applicants also hereby incorporate by reference the disclosures of the following US Patent Applications:

Title: INTEGRATED, SELF SUPPORTING ELEVATED GAS DELIVERY TUBE AND LED LIGHT FOR CROP FOLIAGE
Application No.: 62/367,276
Filing Date: Jul. 27, 2016
Title: GROUND TO CANOPY GASEOUS MEDIA DELIVERY SYSTEM FOR CROPS INCLUDING LEAK DETECTION AND HOOK AND WAND FEATURES
Application No.: 62/403,800
Filing Date: Oct. 4, 2016
Title: MULTI-MEDIA IRRIGATION TECHNOLOGY
Application No.: 62/331,592
Filing Date: May 4, 2016

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A system of promoting plant growth and production for plants growing in beds in elongated rows, comprising a $CO_2$ gas supply; a gas controller communicatively connected to the gas supply; and at least one $CO_2$ gas emitter communicatively connected to the gas controller, the at least one $CO_2$ gas emitter being adapted to be aligned with, and disposed directly over, a row of growing plants, the at least one gas emitter being height adjustable whereby as the plants grow, the at least one gas emitter may remain in close proximity to the growing plants, the at least one $CO_2$ gas emitter comprising a first support post disposed at one end of the row of growing plants, a second support post disposed at an opposite end of the row of plants, and an elongated, flexible gas emission conduit disposed between the first and second support posts, the emission conduit having a first end connected to the first support post and a second end connected to the second support post, the emission conduit having a plurality of gas emission orifices, the emission conduit being aligned in a straight line directly over the row of growing plants, the height of the emission conduit being adjustable by changing a vertical position of connection of the first end of the emission conduit to the first support post and by changing a vertical position of connection of the second end of the emission conduit to the second support post, the emission conduit having an outside diameter of approximately ⅝ inch, whereby the emission conduit may be disposed in close proximity with the growing plants to distribute $CO_2$ gas to the growing plants as the plants grow, and whereby the emission conduit permits light to access the growing plants; wherein the gas supply includes a liquid $CO_2$ tank and a vaporizer connected to the tank to convert liquid $CO_2$ to $CO_2$ gas; and wherein the gas supply further includes a pressure builder communicatively disposed between the tank and the vaporizer.

2. The system of claim 1, wherein the gas controller includes a gas input valve communicatively connected to the gas supply, a gas manifold communicatively connected to the input valve, and an output valve communicatively connected to the gas manifold.

3. The system of claim 1, wherein the gas input valve is connected to the vaporizer.

4. The system of claim 3, wherein the at least one gas emitter further comprises a gas manifold connected between the gas controller and the gas emission conduit.

5. The system of claim 4, wherein the emission conduit is connected at the two ends to the support posts, one end being connected via a tension adjustment assembly to the support post.

6. The system of claim 5, wherein there are two gas emitters, each gas emitter comprising an emission conduit disposed, in use, over the row of growing plants, the emission conduits being connected to the gas manifold.

7. The system of claim 6, wherein the height of each emission conduit is independently height adjustable.

8. The system of claim 5, wherein the at least one $CO_2$ gas emitter further further comprises at least one middle support member.

9. The system of claim 8, wherein the at least one middle support member is height adjustable.

10. The system of claim 1 further comprising an electronic control system, the electronic control system being communicatively connected to the gas controller to control distribution of gas therefrom.

11. The system of claim 10, wherein the electronic control system includes at least one $CO_2$ gas concentration sensor disposed near the gas emitter, the electronic control system monitoring the concentration of $CO_2$ gas near the at least one gas emitter.

12. The system of claim 1, wherein:
a. the gas supply includes a liquid $CO_2$ tank, a pressure builder connected to the tank, and a vaporizer connected to the pressure builder to convert liquid $CO_2$ to $CO_2$ gas;
b. the gas controller includes a gas input valve communicatively connected to the vaporizer, a gas manifold communicatively connected to the input valve, and an output valve communicatively connected to the gas manifold; and
c. the at least one gas emitter includes a gas manifold connected to the output valve, and to the elongated, flexible gas emission conduit.

13. The system of claim 1, wherein, in use, the plant is Cannabis.

14. The system of claim 1, a further comprising at least one hoop house having at least one elongated bed adapted to grow plants, in at least one row, the at least one bed being disposed on grade, with existing soil, and wherein the at least one bed is constructed on a single level in the hoop house.

15. The system of claim 14, wherein there are a plurality of hoop houses, each hoop house is having plural, elongated plant beds, and the flexible gas emission conduit of at least one $CO_2$ gas emitter is aligned longitudinally over each plant bed.

16. A system of promoting plant growth and production for plants growing in beds in elongated rows, on a single level, comprising:
a. a $CO_2$ gas supply, the gas supply includes a liquid $CO_2$ tank, a pressure builder connected to the tank, and a vaporizer connected to the pressure builder to convert liquid $CO_2$ to $CO_2$ gas;
b. a gas controller communicatively connected to the gas supply, the gas controller includes a gas input valve communicatively connected to the vaporizer, a gas manifold communicatively connected to the input valve, and an output valve communicatively connected to the gas manifold;
c. at least one $CO_2$ gas emitter communicatively connected to the gas controller and adapted to be aligned with, and disposed directly over, a row of growing plants, the at least one $CO_2$ gas emitter being height adjustable, over a single level, whereby as the plants grow, the at least one $CO_2$ gas emitter may remain in close proximity to the growing plants, the at least one $CO_2$ gas emitter including: (i) a gas manifold connected to the output valve, and (ii) a flexible, elongated gas emission conduit connected to the gas manifold and having a plurality of gas emission orifices, the emission conduit being aligned in a straight line directly over a row of rowing plants, iii) a first support post disposed at one end of the row of growing plants, and (iv) a second support post disposed at a second end of the row of growing plants, the emission conduit having a first end connected to the first support post and a second end connected to the second support post, the height of the emission conduit being adjustable by changing a vertical position of connection of the first end of the emission conduit to the first support post and by changing a vertical position of connection of the second end of the emission conduit to the second support post, the emission conduit having an outside diameter of approximately ⅝ inch, whereby the emission conduit may be disposed in close proximity with the growing plants to distribute CO2 to the growing plants as the plants grow, and whereby the emission conduit permits light to access the growing plants; and d. wherein each emission conduit is connected at one end via a tension adjustment assembly to a support post.

17. A system of promoting Cannabis plant growth and production in a hoop house for Cannabis plants growing in plural beds in elongated rows, on a single level, comprising:
   a. at least one hoop house having at least one elongated bed adapted to grow plants, in at least one row, the at least one bed being disposed on grade, with existing soil, and wherein the at least one bed is constructed on a single level;
   b. a CO2 gas supply, the gas supply includes a liquid CO2 tank, a pressure builder connected to the tank, and a vaporizer connected to the pressure builder to convert liquid CO2 to CO2 gas;
   c. a gas controller communicatively connected to the gas supply, the gas controller includes a gas input valve communicatively connected to the vaporizer, a gas manifold communicatively connected to the input valve, and an output valve communicatively connected to the gas manifold;
   d. at least one CO2 gas emitter communicatively connected to the gas controller and aligned with, and disposed directly over, a row of growing plants, the at least one CO2 gas emitter being height adjustable whereby as the plant grows, the at least one CO2 gas emitter may remain in close proximity to the plant, the at least one gas emitter including: (i) a gas manifold connected to the output valve, and (ii) a pair of elongated gas emission conduits connected to the gas manifold, each conduit having a plurality of gas emission orifices, the emission conduits being height adjustable proximate the Cannabis plants, each gas emission conduit further comprising:
   a first support post disposed at one end of the row of growing plants and a second support post disposed at a second end of the row of growing plants, each emission conduit having a first end connected to its respective first support post and a second end connected to its respective second support post whereby the emission conduit is aligned in a straight line directly over a row of plants, the height of the emission conduit being adjustable by changing a vertical position of connection of the first end of the emission conduit to the first support post and by changing a vertical position of connection of the second end of the emission conduit to the second support post, the emission conduit having an outside diameter of approximately ⅝ inch whereby the gas emission conduit may be disposed in close proximity with the growing plants to distribute CO2 to the growing plants as they grow, and whereby the emission conduit permits light to access the growing plants;
   e. wherein each emission conduit is connected at one end via a tension adjustment assembly to a support post; and
   f. an electronic control system, the electronic control system being communicatively connected to the gas controller to control distribution of gas therefrom.

18. The system of claim 17, wherein the at least one hoop house:
   a. has a ceiling constructed of flexible plastic material that is at least semi-transparent to sunlight, and
   b. has a ceiling height of between 5 and 9 feet.

* * * * *